US011901119B2

(12) United States Patent
Kelly

(10) Patent No.: US 11,901,119 B2
(45) Date of Patent: Feb. 13, 2024

(54) ON-OFF SWITCHABLE MAGNET ASSEMBLY

(71) Applicant: Julius Kelly, Long Beach, CA (US)

(72) Inventor: Julius Kelly, Long Beach, CA (US)

( * ) Notice: Subject to any disclaimer, the term of this patent is extended or adjusted under 35 U.S.C. 154(b) by 133 days.

(21) Appl. No.: 17/657,190

(22) Filed: Mar. 30, 2022

(65) Prior Publication Data

US 2022/0319752 A1 Oct. 6, 2022

Related U.S. Application Data

(60) Provisional application No. 63/169,269, filed on Apr. 1, 2021.

(51) Int. Cl.
*H01F 7/04* (2006.01)
*H01F 7/02* (2006.01)

(52) U.S. Cl.
CPC ............. *H01F 7/0257* (2013.01); *H01F 7/04* (2013.01)

(58) Field of Classification Search
CPC ................................. H01F 7/04; H01F 7/0257
See application file for complete search history.

(56) References Cited

U.S. PATENT DOCUMENTS 3,239,178 A 3/1966 Pompa
4,754,532 A 7/1988 Thomson
6,707,360 B2 3/2004 Underwood
7,012,495 B2 3/2006 Underwood
7,843,295 B2 11/2010 Fullerton
7,843,296 B2 11/2010 Fullerton
7,889,036 B2 2/2011 Fiedler
8,398,155 B2 3/2013 Andochick
8,430,434 B2 4/2013 Fiedler
8,446,242 B2 5/2013 Harjes
8,514,042 B2 8/2013 Lauder
8,604,900 B2 12/2013 Kocijan
8,665,045 B2 3/2014 Lauder
8,824,166 B2 9/2014 Rohrbach
8,878,639 B2 11/2014 Kocijan
8,925,881 B2 1/2015 Diatzikis
8,970,334 B2 3/2015 Choi
9,016,658 B2 4/2015 Barnard
9,257,872 B2 * 2/2016 Kim ......................... H02K 1/06
9,484,137 B2 11/2016 Kocijan
9,704,632 B2 7/2017 Baca
9,717,339 B2 8/2017 Emery
9,756,905 B2 9/2017 Bielecki
9,773,601 B2 9/2017 Breiwa
9,818,522 B2 11/2017 Kocijan
9,824,808 B2 11/2017 Rihn
9,984,802 B2 * 5/2018 Danielson .............. G01D 5/145
10,156,247 B2 12/2018 Pensak
10,173,292 B2 1/2019 Fullerton
(Continued)

FOREIGN PATENT DOCUMENTS

GB 2469817 A 11/2010

*Primary Examiner* — Mohamad A Musleh
(74) *Attorney, Agent, or Firm* — KOS IP Law LLP

(57) ABSTRACT

An on-off switchable magnet assembly is disclosed which has first and second magnets. The poles of the first magnet are aligned to first and second ferrous members. The second magnets move to align its poles to the first and second ferrous members so that flux from the same or different pole flows through the first and second members to switch the assembly on or off as a magnet assembly.

14 Claims, 51 Drawing Sheets

(56) References Cited

U.S. PATENT DOCUMENTS

| | | | |
|---|---|---|---|
| 10,236,107 B2 | 3/2019 | Choi | |
| 10,327,538 B2 | 6/2019 | Alexander | |
| 10,342,150 B1 | 7/2019 | Davis | |
| 10,532,791 B2 | 1/2020 | Ball | |
| 10,587,158 B2 | 3/2020 | Morton | |
| 11,617,964 B2 * | 4/2023 | Vicentelli | H02K 1/27 446/92 |
| 2002/0105400 A1 | 8/2002 | Underwood | |
| 2005/0012579 A1 | 1/2005 | Underwood | |
| 2009/0027149 A1 | 1/2009 | Kocijan | |
| 2009/0078484 A1 | 3/2009 | Kocijan | |
| 2011/0248806 A1 * | 10/2011 | Michael | H01F 7/04 335/295 |
| 2012/0092104 A1 | 4/2012 | Kocijan | |
| 2012/0200380 A1 | 8/2012 | Kocijan | |
| 2013/0234817 A1 | 9/2013 | Kocijan | |
| 2013/0320686 A1 | 12/2013 | Morton | |
| 2015/0022299 A1 | 1/2015 | Kocijan | |
| 2015/0042427 A1 | 2/2015 | Kocijan | |
| 2015/0042428 A1 | 2/2015 | Kocijan | |
| 2016/0099095 A1 | 4/2016 | Fernandes | |
| 2016/0289046 A1 | 10/2016 | Norton | |
| 2016/0312952 A1 | 10/2016 | Kalis | |
| 2017/0155418 A1 | 6/2017 | Kim | |
| 2017/0232605 A1 | 8/2017 | Morton | |
| 2017/0358962 A1 | 12/2017 | Morton | |
| 2018/0193899 A1 | 7/2018 | Kizilkan | |
| 2018/0311795 A1 * | 11/2018 | Morton | H01F 7/04 |
| 2018/0315563 A1 | 11/2018 | Morton | |
| 2019/0100154 A1 | 4/2019 | Anisfeld | |
| 2019/0168842 A1 | 6/2019 | Ball | |
| 2020/0148303 A1 | 5/2020 | Ball | |
| 2020/0169126 A1 | 5/2020 | Morton | |
| 2020/0185137 A1 | 6/2020 | Morton | |

* cited by examiner

OFF POSITION

OFF POSITION

OFF POSITION

ON POSITION

OFF POSITION

OFF POSITION

OFF POSITION

ON POSITION

OFF POSITION

ON-OFF SWITCHABLE MAGNET ASSEMBLY

CROSS-REFERENCE TO RELATED APPLICATIONS

This application claims the benefits of U.S. Ser. No. 63/169,269, filed on Apr. 1, 2021, the entire contents of which is expressly incorporated herein by reference.

STATEMENT RE: FEDERALLY SPONSORED RESEARCH/DEVELOPMENT

Not Applicable.

BACKGROUND

The various embodiments and aspects described herein relate to a magnet assembly that can be switch so that the assembly is attracted to a ferrous material or not attracted to a ferrous material.

Magnets are used for various situations. However, they are generally always on. Some magnet assemblies can be turned on or off. However, they have certain deficiencies.

Accordingly, there is a need in the art for an improved magnet assembly that can be switched to an on or off condition.

BRIEF SUMMARY

An on-off switchable magnet assembly is disclosed. The assembly has a plurality of first and second magnets. The first magnets are stationary and its first and second poles (e.g., north and south poles) are aligned to first and second ferrous members. In particular, the first poles of the first magnets are aligned to first ferrous members, and the second poles of the first magnets are aligned to second ferrous members. The second magnets also have its first and second poles aligned to the first and second ferrous members but the poles of the second magnet can be switched so that they are aligned either to the same poles or opposition poles. In the off position, the second poles of the second magnets are aligned to the first ferrous members, and the first poles of the second magnets are aligned to the second ferrous members. In the on position, the second poles of the second magnets are aligned to the second ferrous members, and the first poles of the second magnets are aligned to the second ferrous members. By aligned, it is meant that the pole is sufficiently close to the ferrous member so that a majority (e.g., more than 50%) of the flux from the pole of the magnet flows through such member and not a different member.

The movement of the second magnets may be accomplished through gears, springs, rack and pinions (i.e., gears). The movement of the second magnets may be linear, circular about a rotational axis of a circular array, rotational about each of its central axis, curvilinear along a track.

More particularly, an on-off switchable magnet assembly is disclosed. The assembly may comprise a housing, a plurality of first magnets, a plurality of second magnets, a plurality of first ferrous members, a plurality of second ferrous members. The plurality of first magnets may be mounted to the housing. Each of the first magnets may define first and second opposite poles. The plurality of second magnets may be mounted to the housing. Each of the second magnets may define first and second opposite poles.

The plurality of first ferrous members may be mounted to the housing. The plurality of second ferrous members may be mounted to the housing.

In the off position, each of the first poles of the first magnets may be closest to the first ferrous members. Plus, each of the second poles of the first magnets may be closest to the second ferrous members. Also, each of the first poles of the second magnets may be closest to the second ferrous member and each of the second poles of the second magnets may be closest to the first ferrous member.

In the on position, each of the first poles of the first magnets may be closest to the first ferrous members. Each of the second poles of the first magnets may be closest to the second ferrous members. Each of the first poles of the second magnets may be closest to the first ferrous member and each of the second poles of the second magnets may be closest to the second ferrous member.

The first and second magnets may be arranged in a linear array.

The first and second magnets may be arranged in a radial array.

The first magnets may be stationary. In contrast, the second magnets may be traversed in a straight direction to traverse the first poles of the second magnets from being closest to the second ferrous member to the first ferrous member, and the second poles of the second magnets from being closest to the first ferrous member to the second ferrous member. The second magnets may be held together with a sub frame or housing for traversing the second magnets in the straight direction simultaneously.

Alternatively, the first magnets may be stationary. In contrast, the second magnets may be traversed in a curved direction to traverse the first poles of the second magnets from being closest to the second ferrous member to the first ferrous member, and the second poles of the second magnets from being closest to the first ferrous member to the second ferrous member. The second magnets may be held together with a sub frame or housing for traversing the second magnets in the curved direction simultaneously.

The second magnets may be rotatable about a rotational axis to traverse the first poles of the second magnets from being closest to the second ferrous member to the first ferrous member, and the second poles of the second magnets from being closest to the first ferrous member to the second ferrous member.

The housing may be fabricated from a non ferrous material.

The first ferrous members may not directly contact each other and may not directly contact any of the second ferrous members, and the second ferrous members may not directly contact each other and may not directly contact any of the first ferrous members.

In another aspect, a method of switching an on-off switchable magnet assembly is disclosed. The method may comprise the steps of providing the on-off switchable magnet assembly, the assembly comprising: a housing; a plurality of first magnets mounted to the housing, each of the first magnets defining first and second opposite poles; a plurality of second magnets mounted to the housing, each of the second magnets defining first and second opposite poles; a plurality of first ferrous members mounted to the housing; a plurality of second ferrous members mounted to the housing; wherein the first poles of the first magnets are closest to the first ferrous members and the second poles of the first magnets are closest to the second ferrous members; switching the on-off switchable magnet assembly from the off position to the on position; traversing the first poles of the second magnets from being closest to the second ferrous members to being closest to the first ferrous members and the second poles of the second magnets from being closest to the first ferrous members to being closest to the second ferrous members; switching the on-off switchable magnet assembly from the on position to the off position; traversing the first poles of the second magnets from being closest to the first ferrous members to being closest to the second ferrous members and the second poles of the second magnets from being closest to the second ferrous members to the first ferrous members.

In the method, the step of traversing the first poles of the second magnets from being closest to the first ferrous members to being closest to the second ferrous members and the second poles of the second magnets from being closest to the second ferrous members to the first ferrous members may comprise a step of traversing the second magnets in a straight direction.

In the method, the step of traversing the first poles of the second magnets from being closest to the first ferrous members to being closest to the second ferrous members and the second poles of the second magnets from being closest to the second ferrous members to the first ferrous members may comprise a step of traversing the second magnets in a curved direction.

In the method, the step of traversing the first poles of the second magnets from being closest to the first ferrous members to being closest to the second ferrous members and the second poles of the second magnets from being closest to the second ferrous members to the first ferrous members may comprise a step of rotating the second magnets about a rotational axis.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
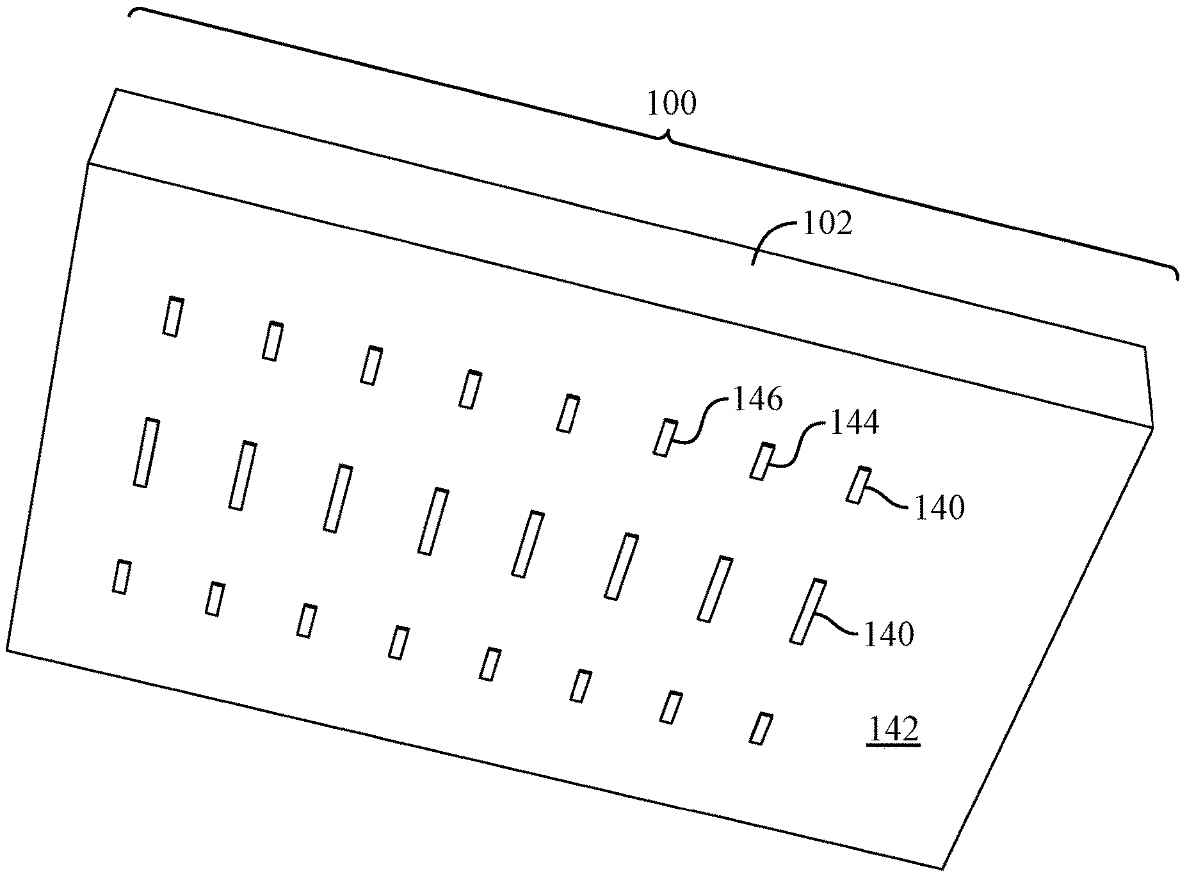
FIG. 1 is a perspective view of a first embodiment of an on-off switchable magnet assembly.

Referring now to the drawings, an on/off switchable magnet assembly 100, 200, 300, 400, 500, 600 is shown in FIGS. 1, 10, 15, 22, 28, and 35. Each of the on/off switchable magnum assemblies 100-600 may have a housing 102, 202, 302, 402, 502, 602. The housing may hold a plurality of first magnets 104 (FIG. 3), 204 (FIG. 13), 304 (FIG. 20), 404 (FIG. 27), 504 (FIG. 33), 604 (FIG. 38) so that the first magnets 104-604 are fixedly attached to the housing 102-602. The housings 102-602 also contain a plurality of second magnets 106-606. The first magnets 104-604 are stationary and do not move (e.g., circularly, rotationally or linearly) in relation to the housing 102-602. The second magnets 106-606 may move (e.g., circularly, rotationally about a central axis, linearly, about an curvilinear path), as discussed below in order to traverse the magnet assembly between the on and off position. The housing 102-602 may also have a plurality of first ferrous members 108-608 and second ferrous members 110-610. First poles, 112-612 of the first magnets 104-604 may be immediately adjacent to or closest to the first ferrous members 108-608. The opposite or second poles 114-614 of the first magnets 104-604 may be immediately adjacent to or closest to the second ferrous members 110-610.

The second magnets 106-606 may move so that its first pole 116-616 may initially be aligned to the second ferrous member 110-610 and the second pole 118-618 of the second magnets 106-606 may be immediately adjacent to or closest to the first ferrous members 108-608 when the assembly is in the off position, then traversed to the on position wherein the second magnets 106-606 may move (e.g., including but not limited to move circularly, rotate about a central rotation axis, linearly translate or traverse along a curvilinear path) so that the first poles 116-616 of the second magnets 106-606 are then aligned to the first ferrous members 108-608 and the second poles 118-618 are also aligned to the second ferrous members 110-610.

In the on position, the flux from the first poles 114-614, 118-618 of the first and second magnets 104-604, 106-606 predominantly flow through the immediately adjacent first ferrous member 108-608. Moreover, the flux from the second poles, 114-614, 118-618 of the first and second magnets 104-604, 106-606 predominantly flow through the second ferrous members 110-610. The flux that flows through the first and second adjacent ferrous members 108-608, 110-610 are attracted to each other and jump over so that the flux protrudes out of the housing 102-602 (FIGS. 1, 10, 15, 22, 28, and 35) so that the assemblies 100-600 are attracted to a ferrous material.

In the off position, the flux 190-690 stays within the respective first and second ferrous members as shown in FIGS. 2, 14, 20, 27, 34, 38. The flux from the first pole 114, 614 of the first magnets 104-604 are attracted to or mate with the flux from the second poles 118-618 of the second magnets 106-606 via the first ferrous members 108-608. Also, the flux from the second poles 114-614 of the first magnets 104-604 are attracted to or mate with the flux from the first poles 116-616 of the second magnets 106-606 via the second ferrous members 110-610. The flux from the first poles of the first magnets and the flux from the second poles of the second magnets predominantly stays within the first ferrous members. Also, the flux from the second poles of the first magnets and the flux from the first poles of the second magnets predominantly stays within the second ferrous members.

The assemblies 100-600 may also have a locking mechanism 120-620 so as to lock the second magnets 106-606 in either the on position or the off position. The locking mechanism 120-620 may also have a biasing member 122-622 (e.g. spring) that biases the second magnet 106-606 either in the on position or the off position. If the locking mechanism 120-620 locks the assemblies 100-600 in the on position, then the biasing member 122-622 biases the locking mechanism 120-620 so that the second magnets 106-606 are in the off position. Conversely, if the locking mechanism 120-620 locks the assemblies 100-600 in the off position, then the biasing member 122-622 biases the locking mechanism 120-620 so that the second magnets 106-606 are in the on position.

FIGS. 1-9 illustrate a first embodiment. FIGS. 10-14 illustrate a second embodiment. FIGS. 15-21 illustrate a third embodiment. FIGS. 22-27 illustrate a fourth embodiment. FIGS. 28-34 illustrate a fifth embodiment. FIGS. 35-45 illustrate a sixth embodiment.

More particularly, and referring now to FIGS. 1, 10, 15, 22, 28, 35, the housings 102-602 are shown. The housing 102-602 may have a plurality of apertures 140-640 distributed along one side or surface 142-642 thereof. These apertures 140-640 exposes the end surfaces 144-644, 146-646 of the first and second ferrous members 108, 110, as shown in FIGS. 1 and 4, 10 and 12, 15 and 21, 22 and 24, 28 and 32, 35 and 38. The end surfaces 144-644, 146-646 may be flush with the surface 142-642 of the housing 102-602. In this way, when the assembly 100-600 is in the on position, the magnetic flux can proceed out of the housing 102 through the end surfaces 144-644, 146-646 so as attract a ferrous material. Moreover, the end surface 144-644, 146-646 of the second ferrous members 108, 110 may protrude slightly out of the end surface 142 of the housing 102.

It is also contemplated that end surfaces 144-644, 146-646 may be slightly recessed within the apertures 140-640 so that when the assembly 100-600 is in the on position, the surface 142-642 of the housing 102-602 contacts the ferrous material, not the end surfaces 144-644, 146-646. The surface 142-642 may be lined with a non-marring, non-scratching material so that the ferrous material to which the assembly 100-600 is attracted to is not marred or scratched by the assembly 100.

Figure 2:
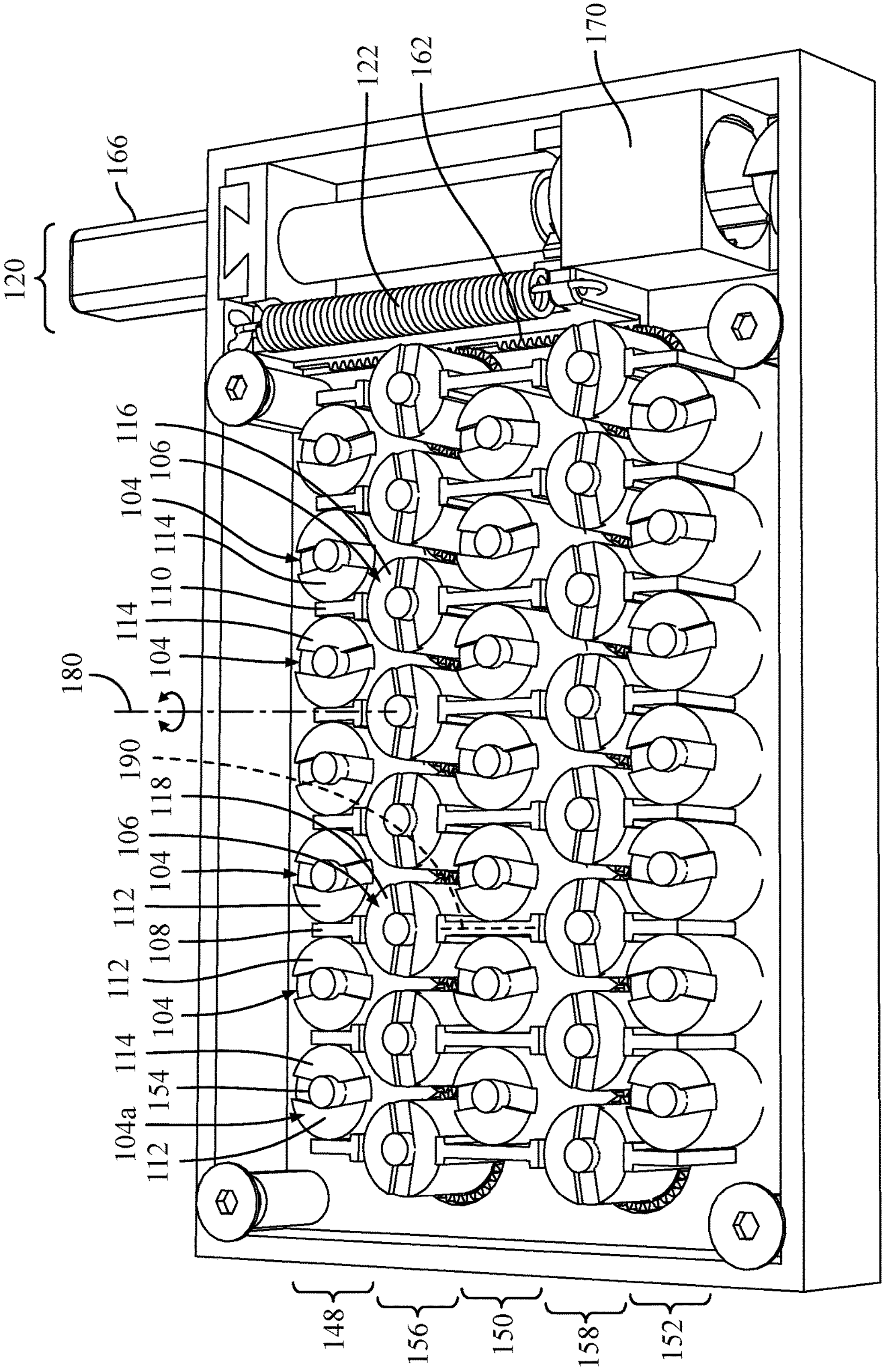
FIG. 2 is a perspective view of the first embodiment on the opposite side with a portion of a housing not shown to show first and second magnets in an off position.
Figure 14:
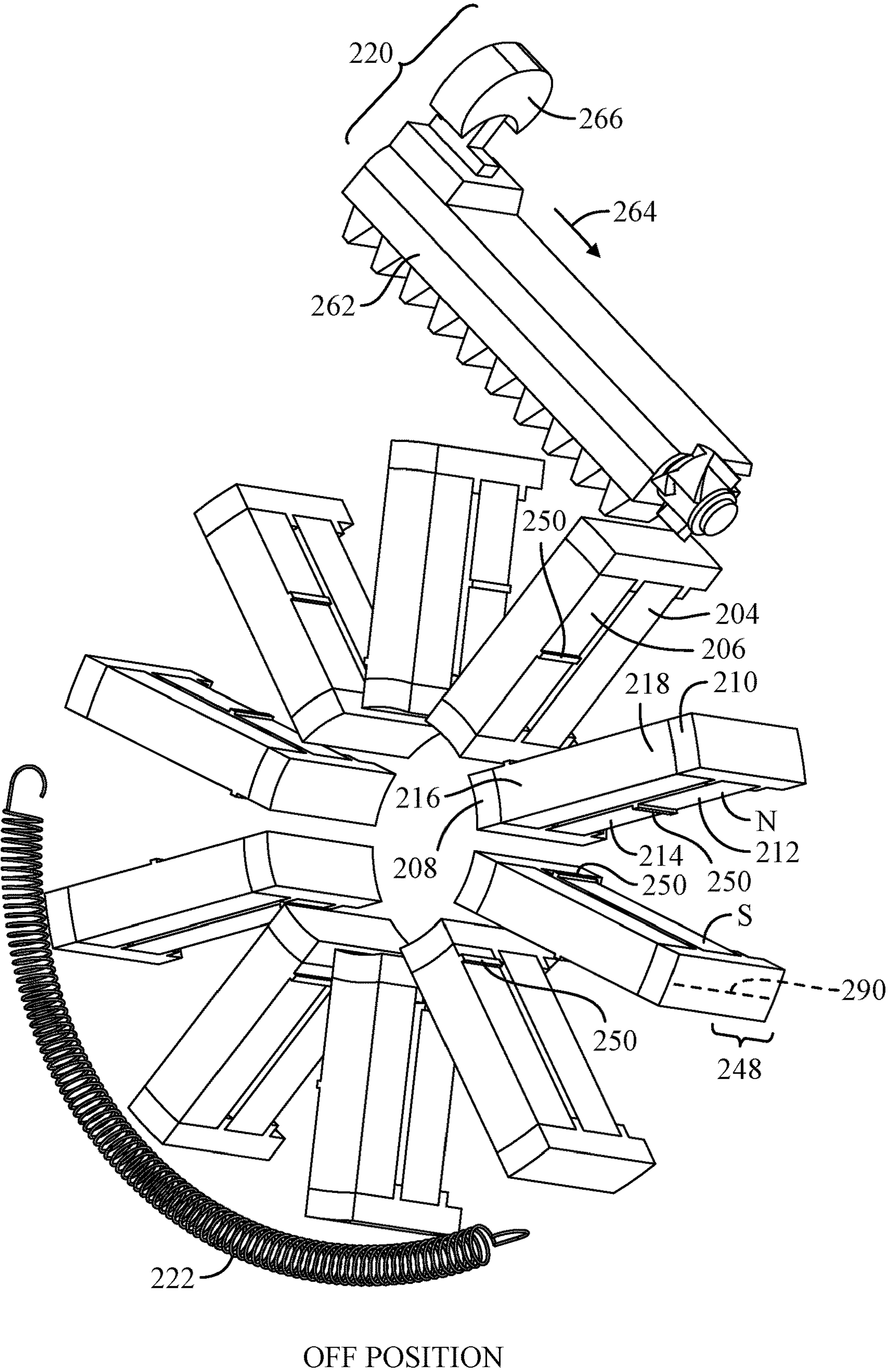
FIG. 14 is a perspective view of the second embodiment not showing the subframe and the first and second magnets in an off position.
Figure 15:
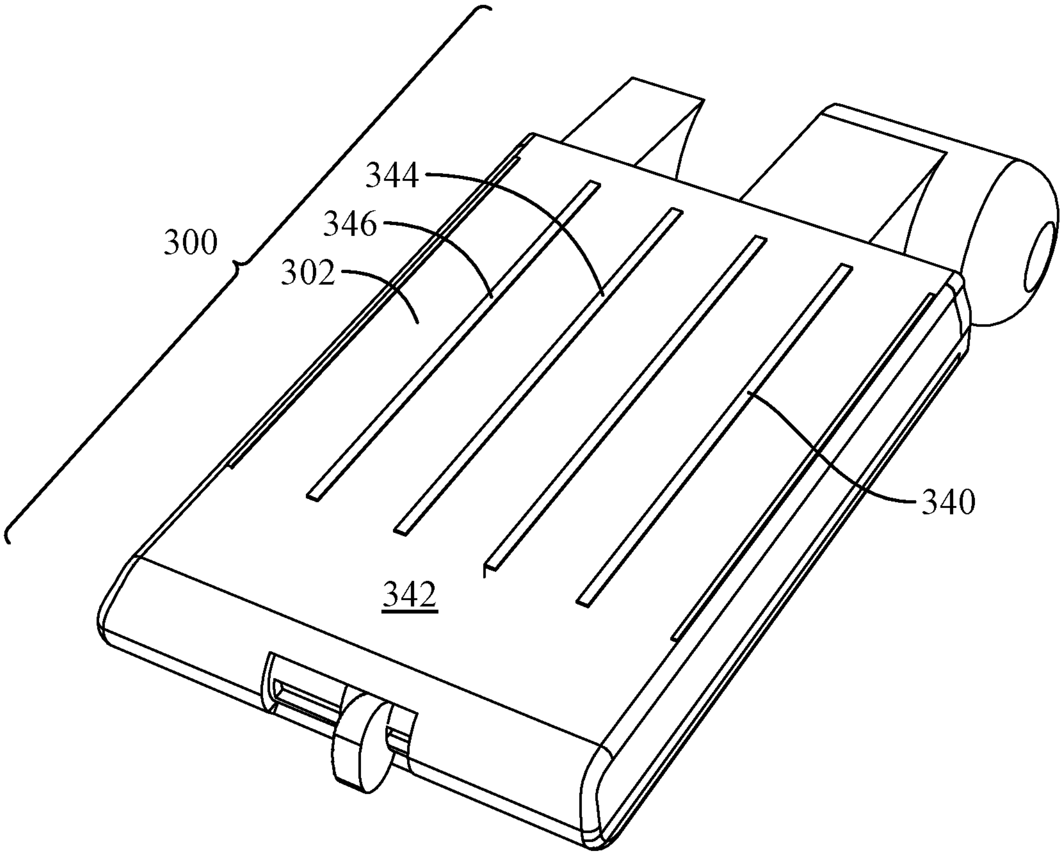
FIG. 15 is a perspective view of a third embodiment of an on-off switchable magnet assembly.
Figure 16:
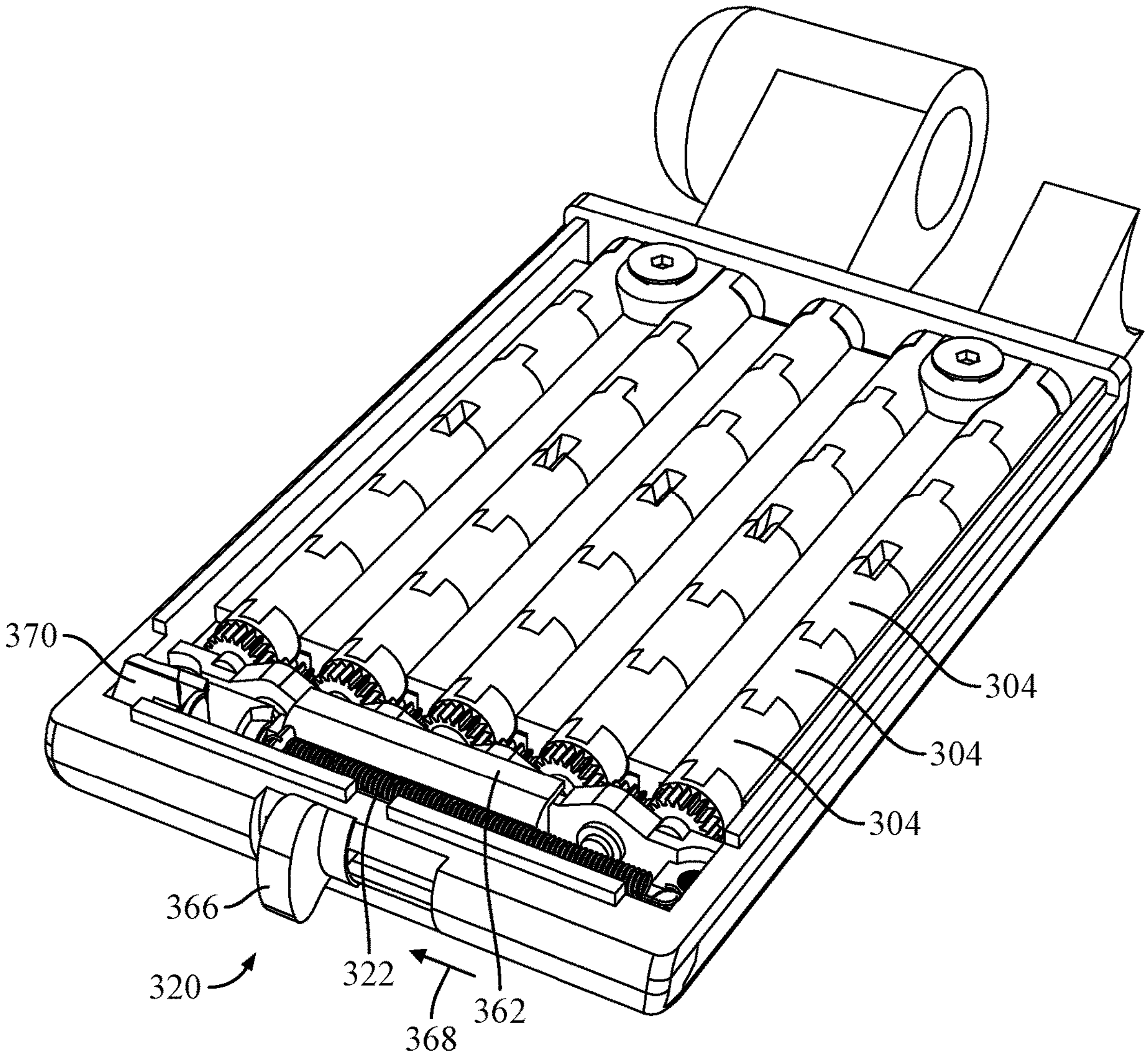
FIG. 16 is a perspective view of the third embodiment on the opposite side with a portion of a housing not shown.

Referring now to FIG. 2 in relation to the first embodiment, the assembly 100 may have first, second, third rows 148, 150, 152 of first magnets 104. Referring now to FIG. 14, the assembly 200 may have one circular array 248 of first magnets 204. The circular array 248 of first magnets 204 are the lower magnets in FIG. 14. The first magnets 104 may be stationary and may be fixed to the housing 102. The first magnets 104 may be positioned in an alternating fashion so that the first poles 112 of an immediately adjacent first magnet 104 is immediately adjacent to a first ferrous members 108. Also, the second poles 114 of the first magnets 104 are immediately adjacent to second ferrous members 110.

Referring now to FIG. 14 in relation to the second embodiment, the assembly 200 has a circular array 248 of first magnets 204. The first array 248 of first magnets 204 remain stationary and may be fixed to the housing 202. Every other first magnet 204 is flip flopped in terms of the first pole and second pole orientation. Two of the first magnets 204 are labeled with North ("N") and South ("S") poles. The next adjacent one is oriented in reverse until the entire array is completed. In the second embodiment, the protrusion 250 indicates the first pole of the first magnet. In the magnets 204, 206 where the protrusion is in the middle, the first pole is at the outward extremes of the first and second magnets.

Figure 20:
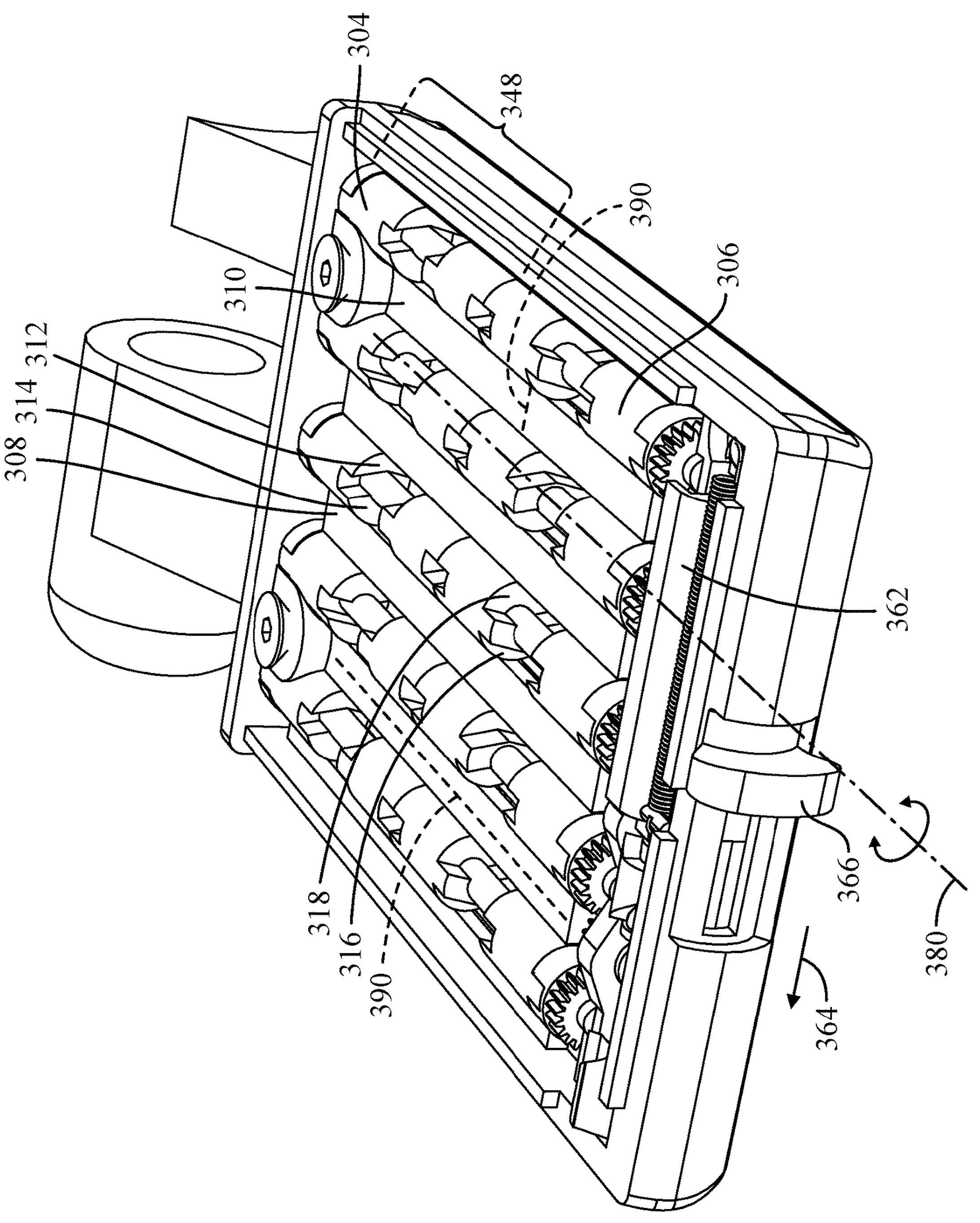
FIG. 20 illustrates the same view as that shown in FIG. 17 except that the second magnets are traversed to the off position.

Referring now to FIG. 20 in relation to the third embodiment, the assembly 300 may have a linear array 348 (see FIGS. 16 and 20) of first magnets 304. Some of the first and second magnets 304, 306 have been hidden for clarity and to show the arrow or indication of the first and second poles of the first and second magnets. Instead of a groove to indicate the arrow, a protrusion 348 shows the arrow for the first magnets, while a groove indicates the arrow in the second magnets 306.

Figure 27:
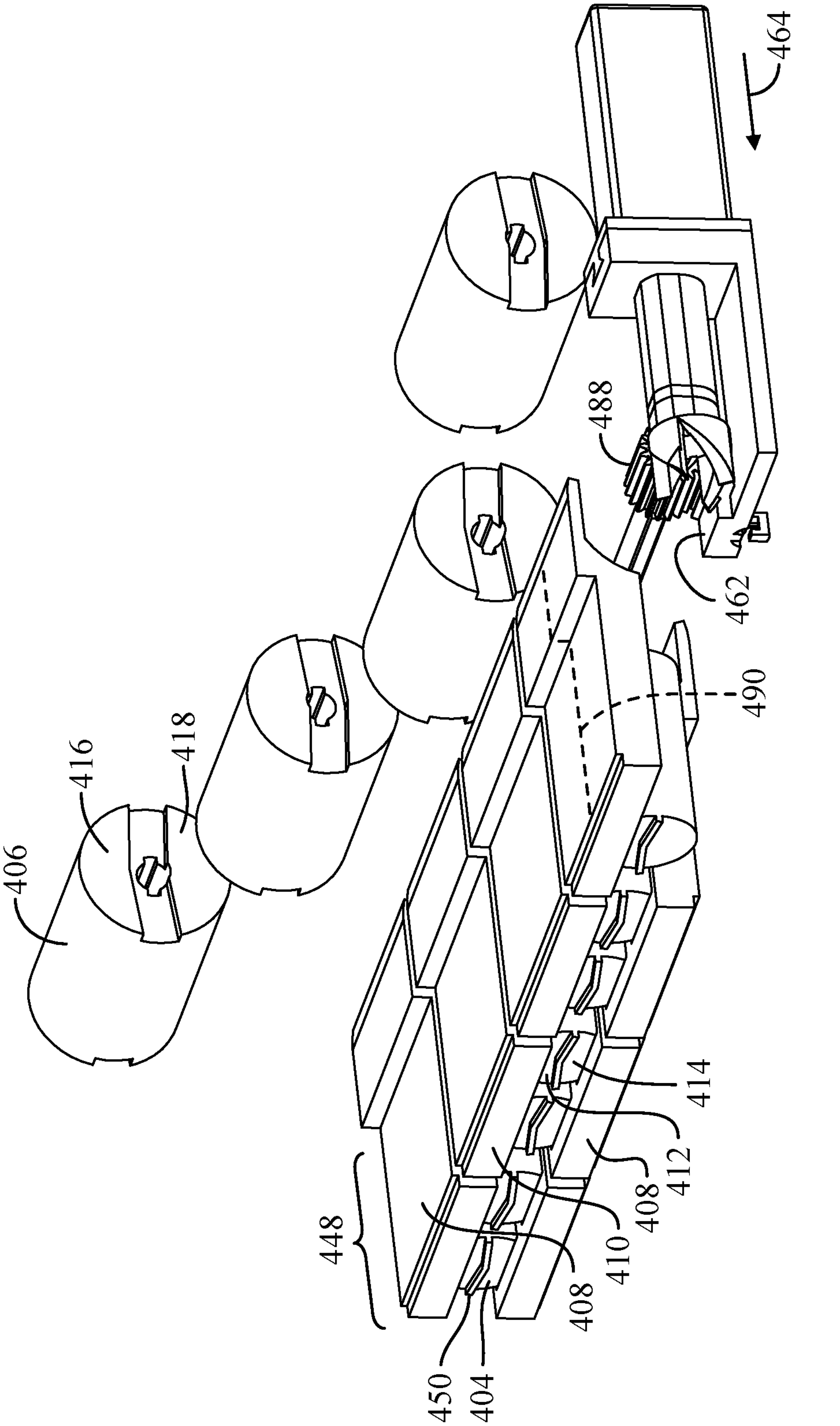
FIG. 27 is the same view shown in FIG. 24 and the second magnets and the assembly in an off position.
Figure 28:
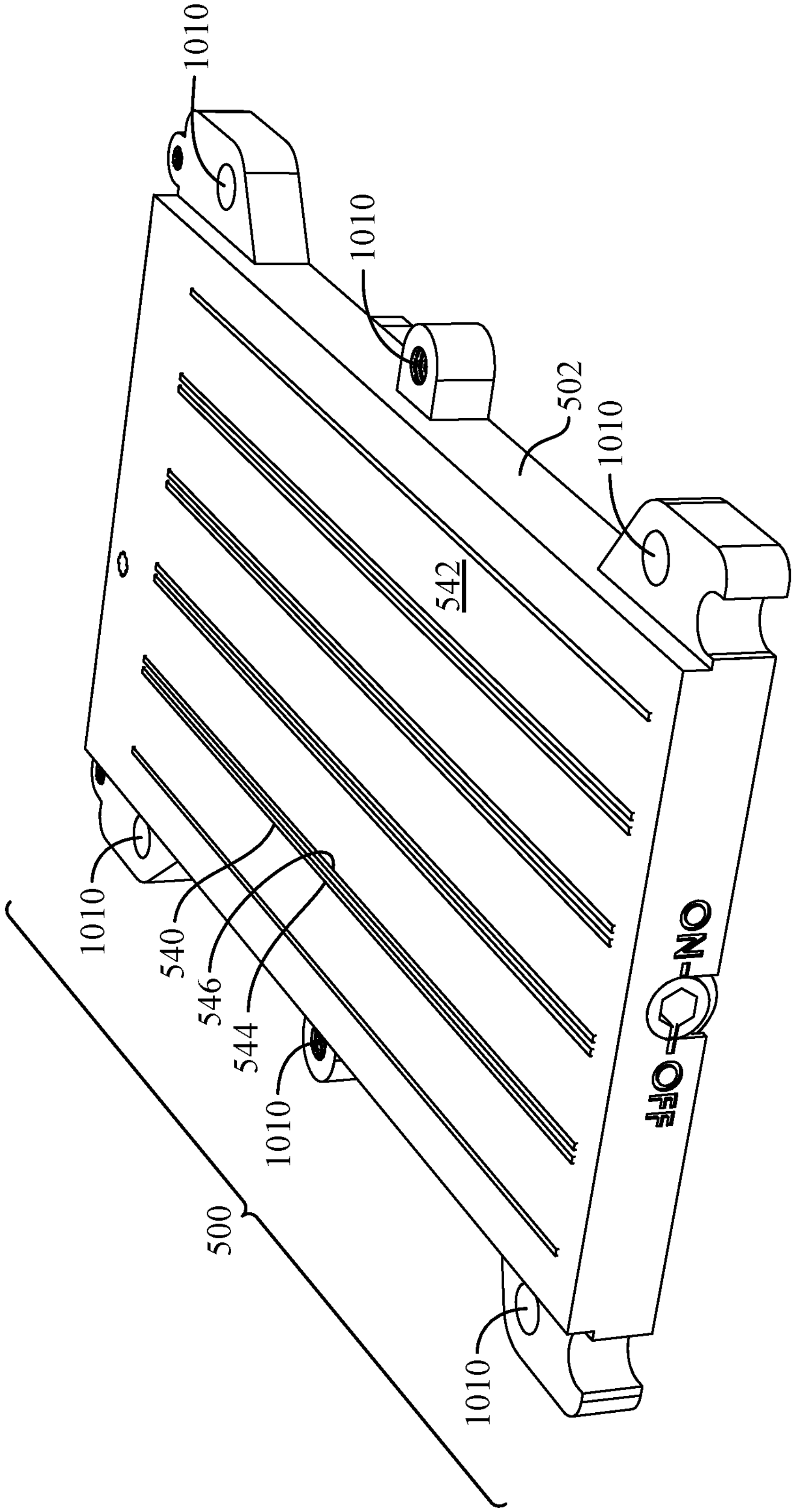
FIG. 28 is a perspective view of a fifth embodiment of an on-off switchable magnet assembly.

Referring now to FIG. 27 in relation to the fourth embodiment, the assembly 400 has a row 448 of first magnets 404. The first and second poles alternate as shown by the arrows 450. The first two first magnets on the left side has the first poles on the lower side. The next two has the first poles on the upper side. The next two has the first poles on the lower side. The next two has the first poles on the upper side. The last first magnet 204 on the right side is not shown.

Figure 33:
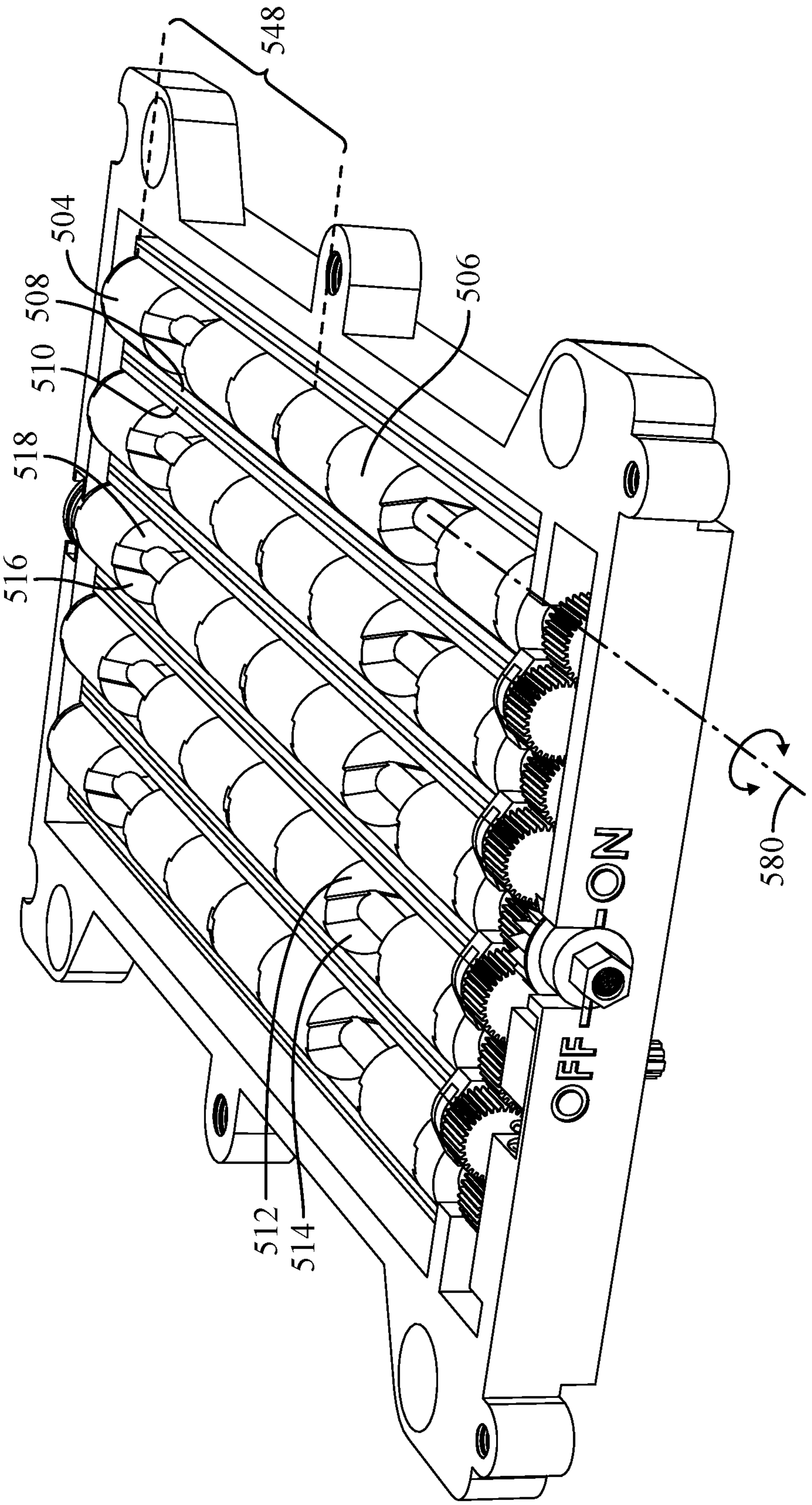
FIG. 33 is the same view as that shown in FIG. 30 except that the second magnets and the assembly are in the off position.

Referring now to FIG. 33 in relation to the fifth embodiment, the assembly 500 has a row 548 of first magnets 504.

Figure 41:
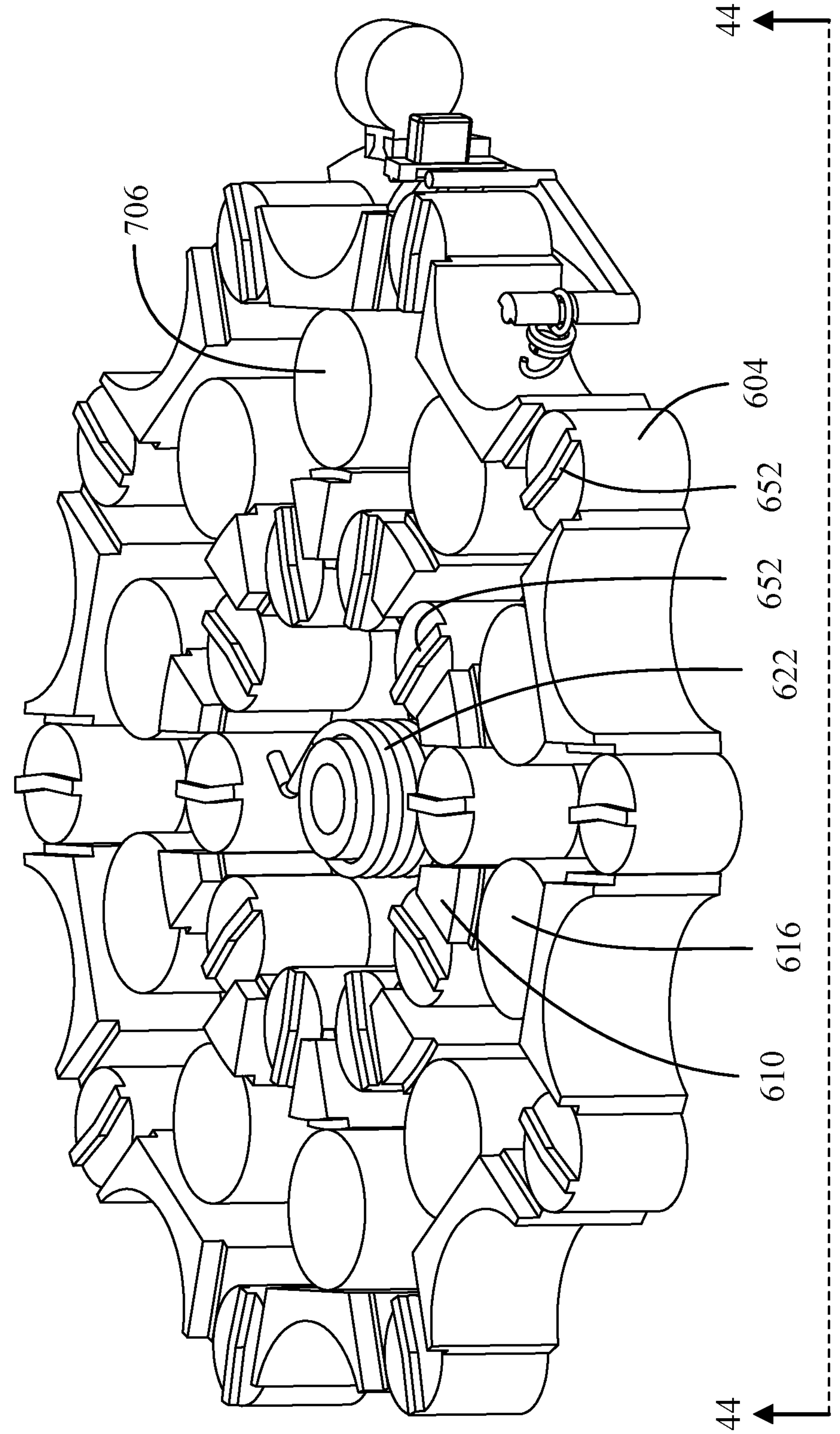
FIG. 41 is a perspective view of the assembly without the housing in an on position.
Figure 45:
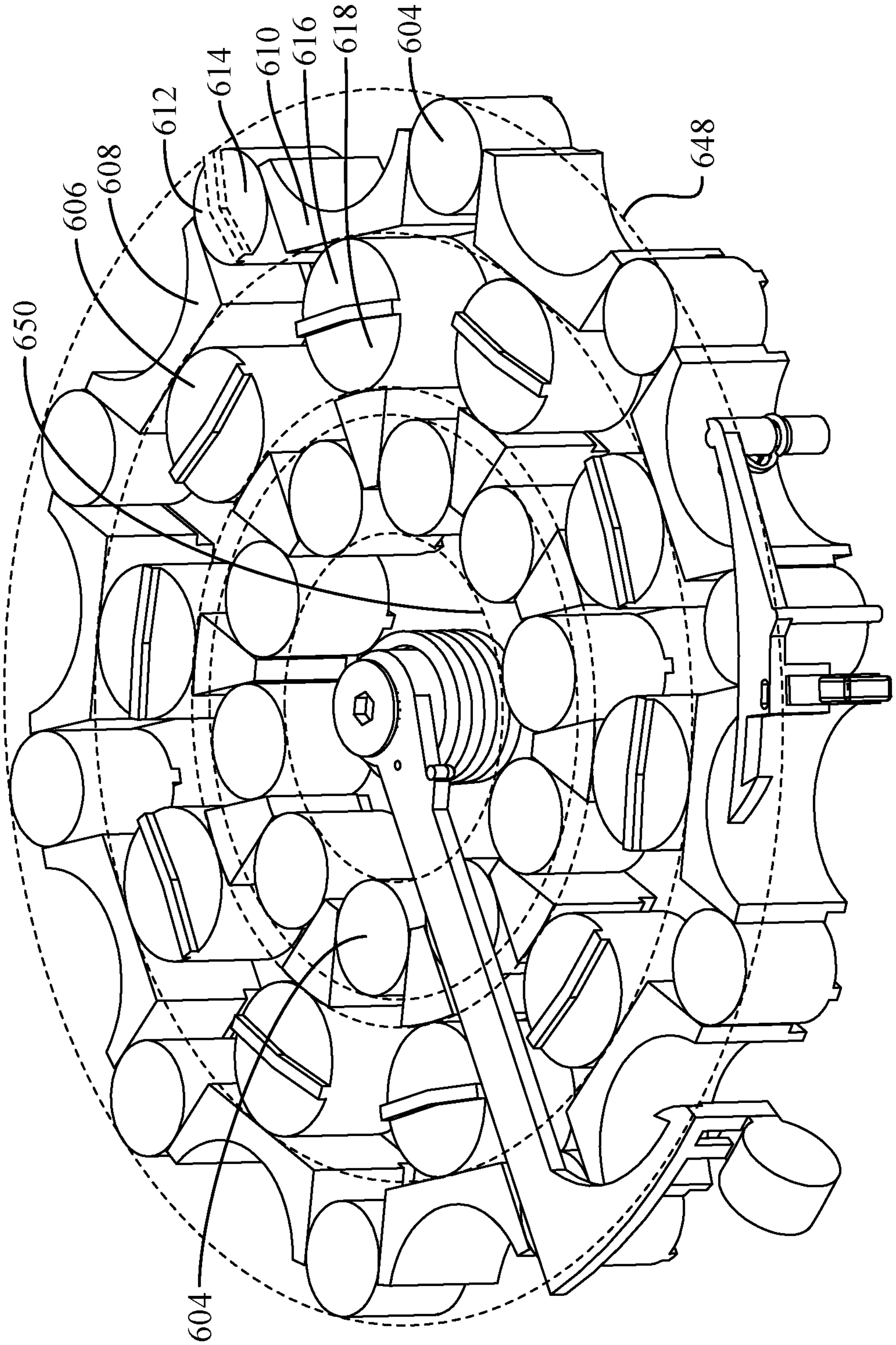
FIG. 45 is a perspective view of the assembly with the second magnets in the off position
Figure 46:
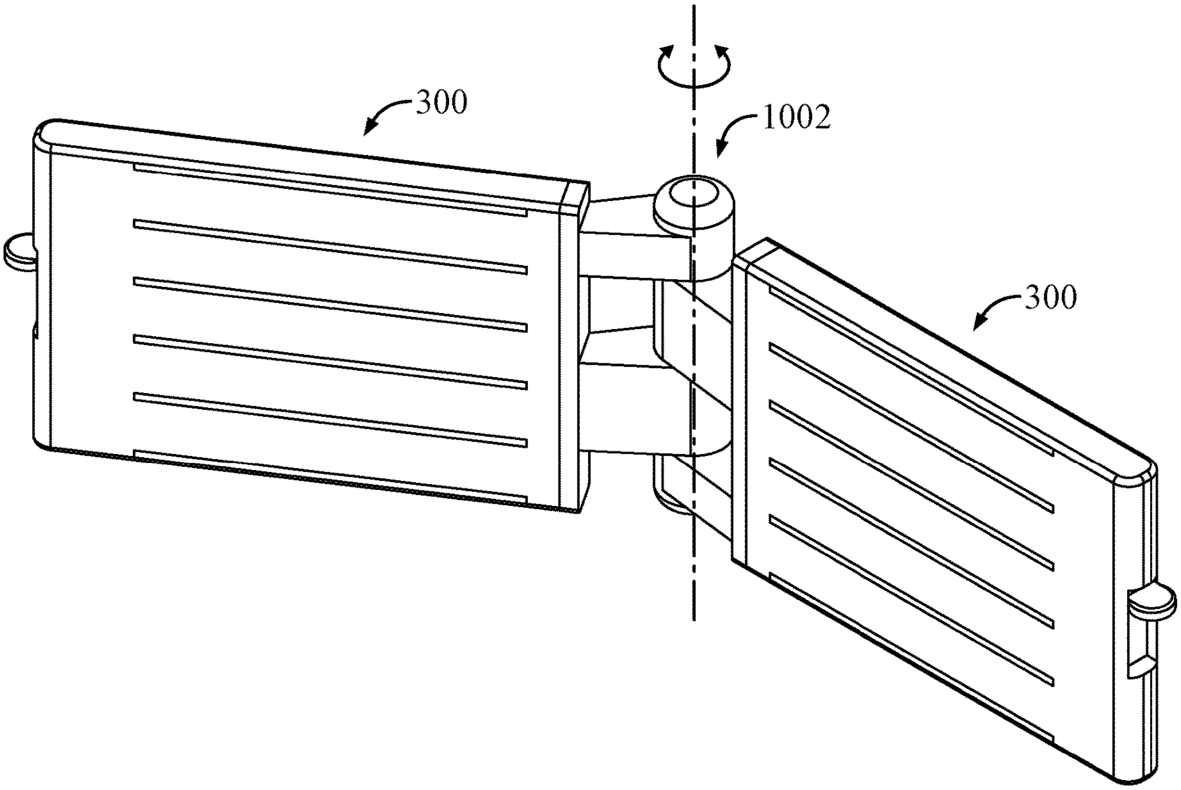
FIG. 46 illustrates a first side of an assembly.

Referring now to FIG. 45 in relation to the sixth embodiment, the assembly 600 has first and second circular arrays 648, 650 of first magnets 604. The first and second pole orientations are shown in FIG. 41 which can be shown by the arrow 652.

In the embodiments discussed herein, to identify the first and second poles 112-612, 114-614 of the first and second magnets 104-604, 106-606, one of the surfaces of the first and second magnets 104-604, 106-606 may be marked, engraved or somehow identified with an arrow. For example, as shown in FIG. 2, the first magnet 104*a* has a beveled groove 154. As shown, the beveled groove is pointing to the left. The direction in which the arrow or beveled groove 154 points to is the first pole 112. The other side is the second pole 114. The first pole 112 may be either the north or south pole of a magnet. The second pole 114 is the opposite pole. By way of example and not limitation, if the first pole 112 is a north pole, then the second pole 114 is a south pole, and vice versa. The identification of the first and second poles 112, 114 as it was described in relation to the first embodiment may be and have been applied to the first and second magnets 204-604, 206-606 in identifying their first and second poles 212-612, 214-614.

The assembly 100-600 may have one or more rows or arrays of second magnets 106. The row(s) or array(s) of the second magnets 106 may move to traverse the assembly 100-600 between the on position and the off position.

In the first embodiment shown in FIGS. 1-9, the second magnets 106 are fixed to the housing but may rotate about a rotational central axis in that the second magnets 106 stay in place and rotate about the rotational central axis 180 (see FIG. 2). In contrast, the first, second, and third rows 148-152 of the first magnets 104 may be stationary. They are fixed to the housing 102. However, it is also contemplated that the second magnets may be traversed circularly, linearly, along a curvilinear path or combinations thereof.

In the second embodiment, the circular array of second magnets 206 rotate about a central axis 280 (see FIG. 12) of the collective second magnets 206. In contrast, the first magnets 204 are stationary and are fixed to the housing 202.

In the third embodiment, the second magnets 306 rotate about its own central axis 380 (see FIG. 20). In contrast, the first magnets 304 are stationary and are fixed to the housing 302.

Figure 25:
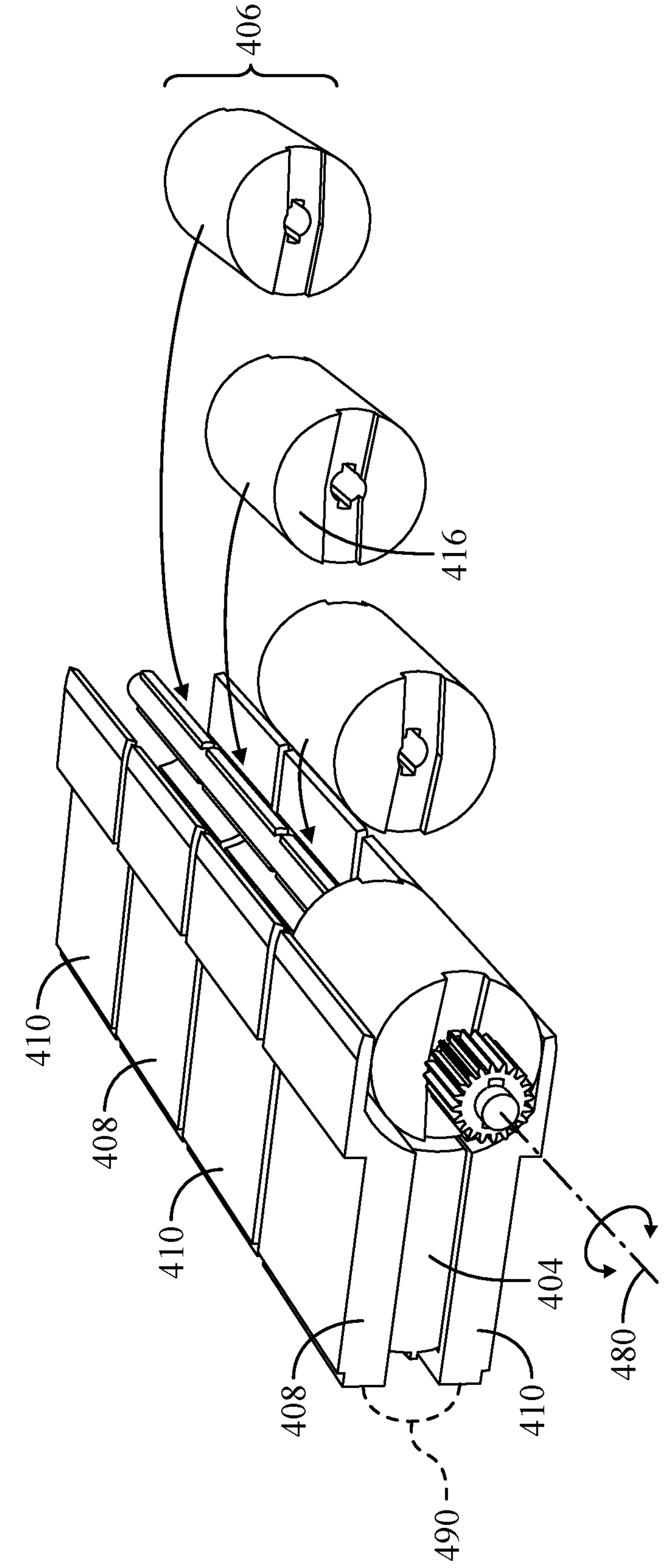
FIG. 25 is a perspective view of the assembly shown in FIG. 23 without the housing and the second magnets exploded.
Figure 26:
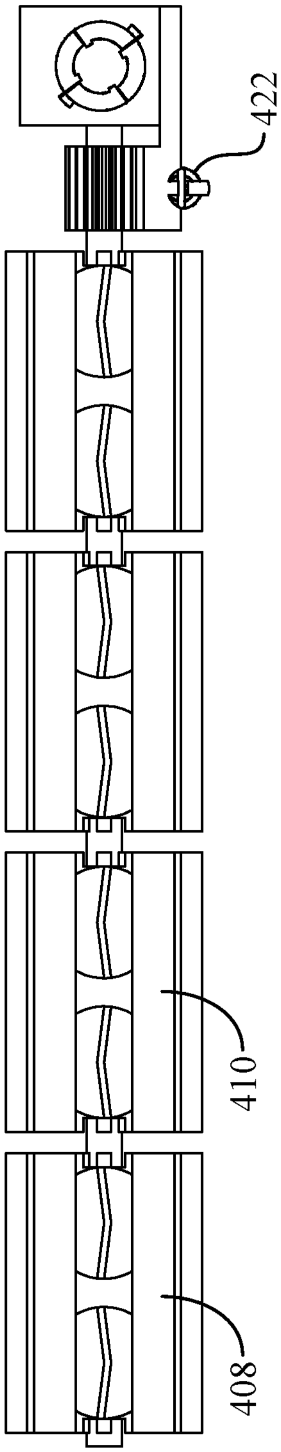
FIG. 26 is a front view of the assembly without the housing.

In the fourth embodiment, the second magnets 406 rotate about its own central axis 480 (see FIG. 25). In contrast, the first magnets 404 are stationary and are fixed to the housing 402.

In the fifth embodiment, the second magnets 506 rotate about its own central axis 580 (see FIG. 33). In contrast, the first magnets 504 are stationary and are fixed to the housing 502.

Figure 38:
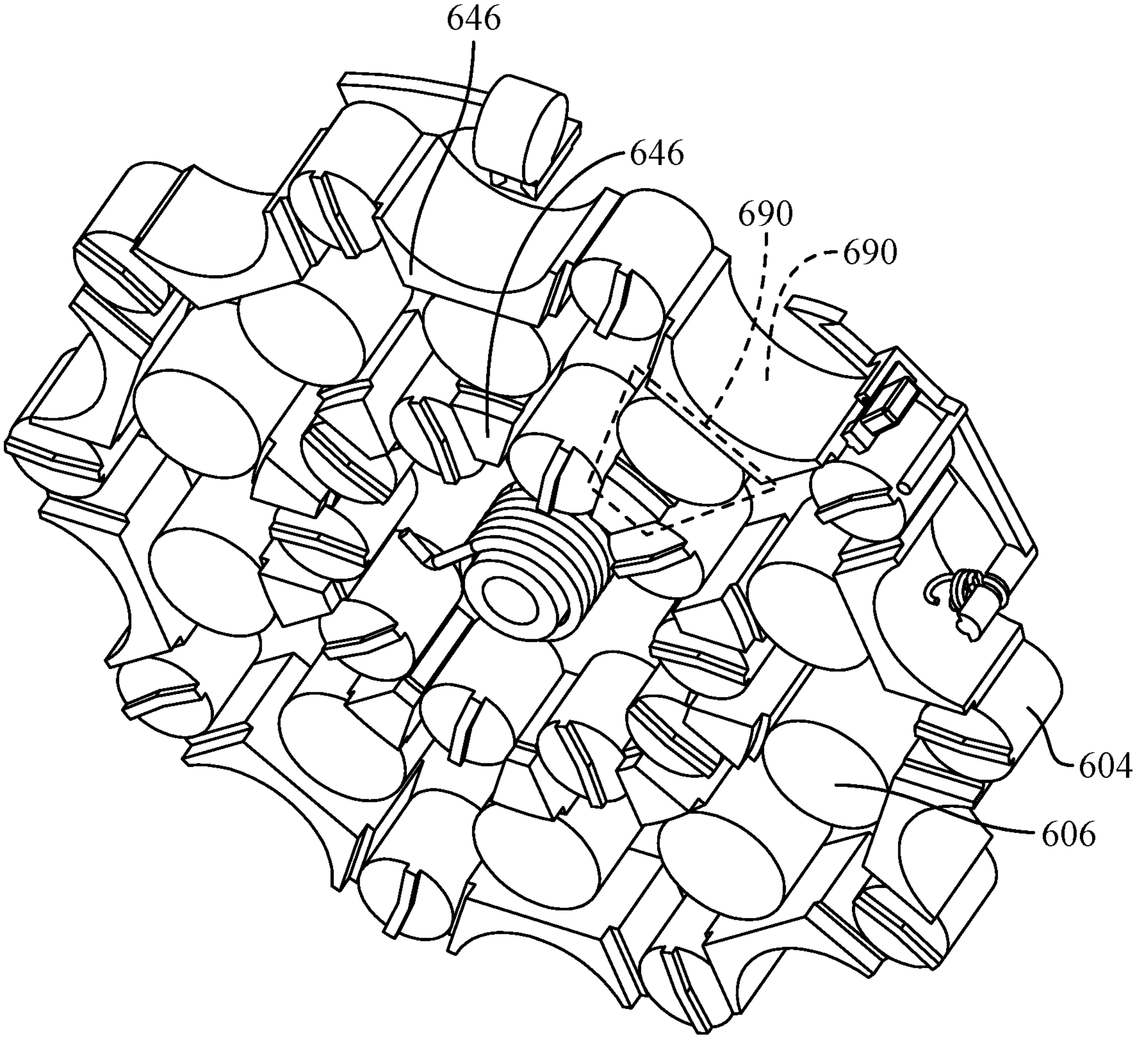
FIG. 38 is the same view as shown in FIG. 35 with the housing not shown and the second magnets and the housing in an off position.
Figure 39:
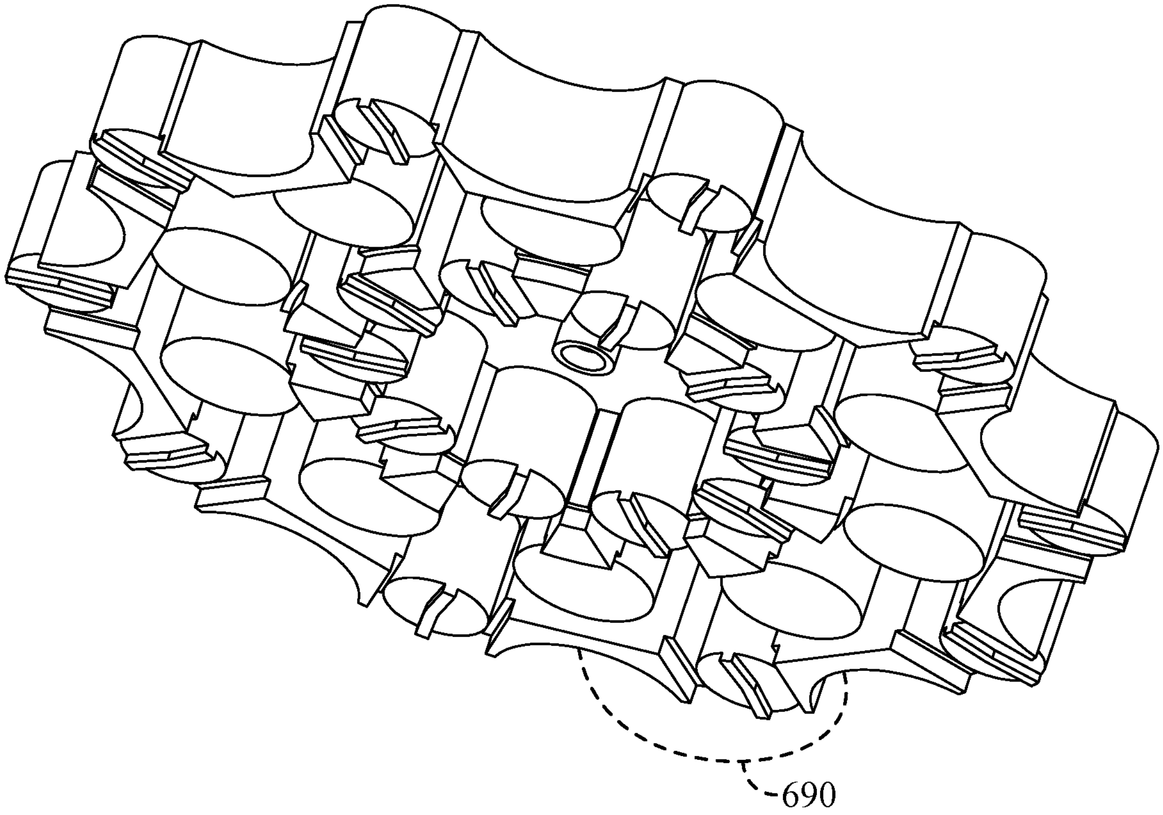
FIG. 39 is the same view shown in FIG. 38 except the second magnets and the assembly are in an off position.
Figure 40:
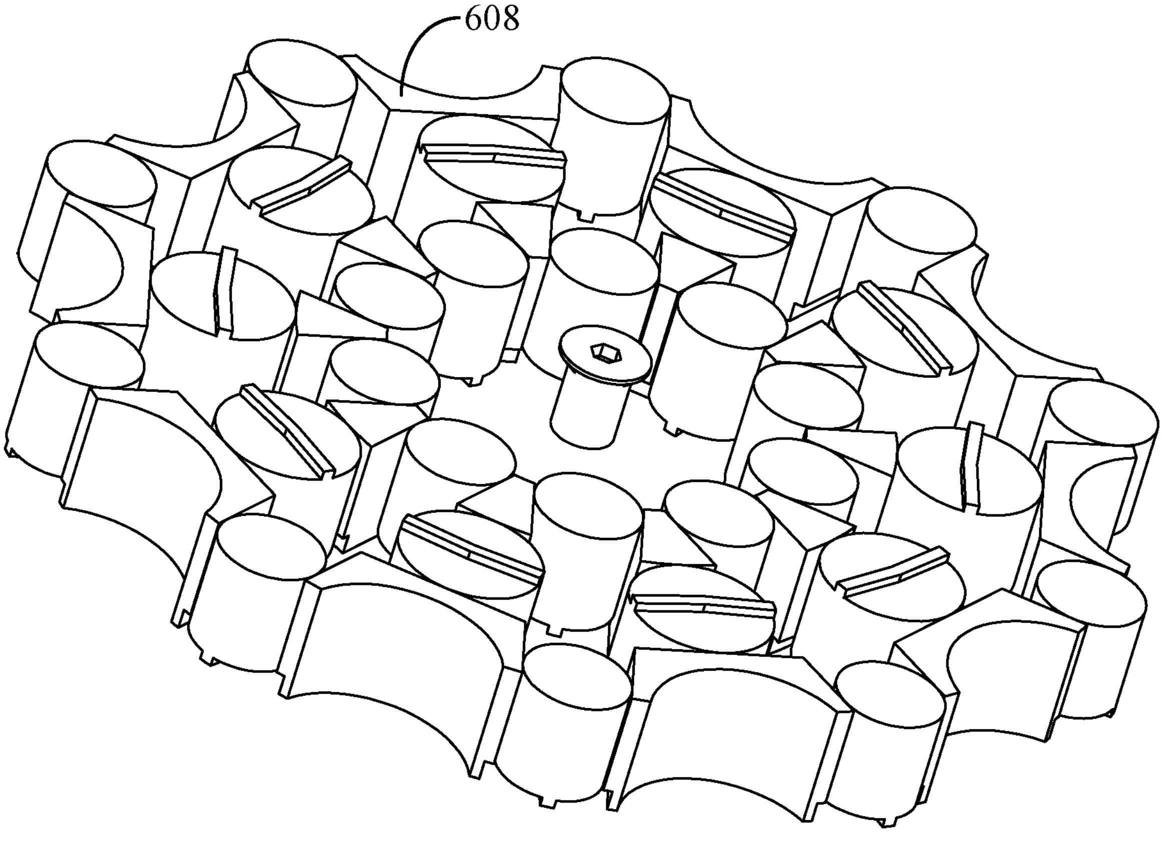
FIG. 40 illustrates the same view as FIG. 36 except without the housing.

In the sixth embodiment, the second magnets 606 (see FIG. 38). In contrast, the first magnets 504 are stationary and are fixed to the housing 502.

Figure 5:
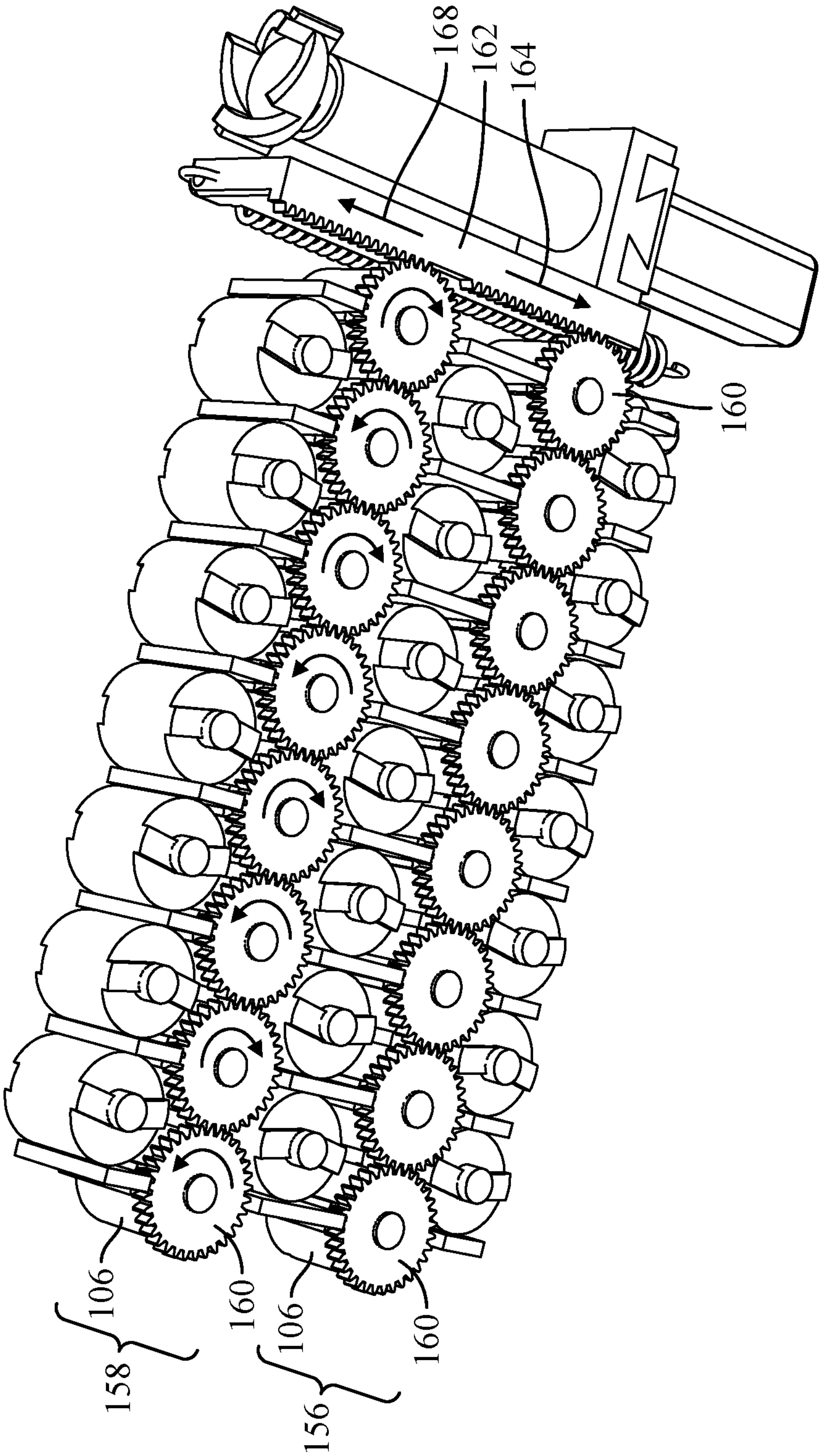
FIG. 5 is the same view as shown in FIG. 4 and showing gears for rotating the second magnets between the on and off positions.
Figure 6:
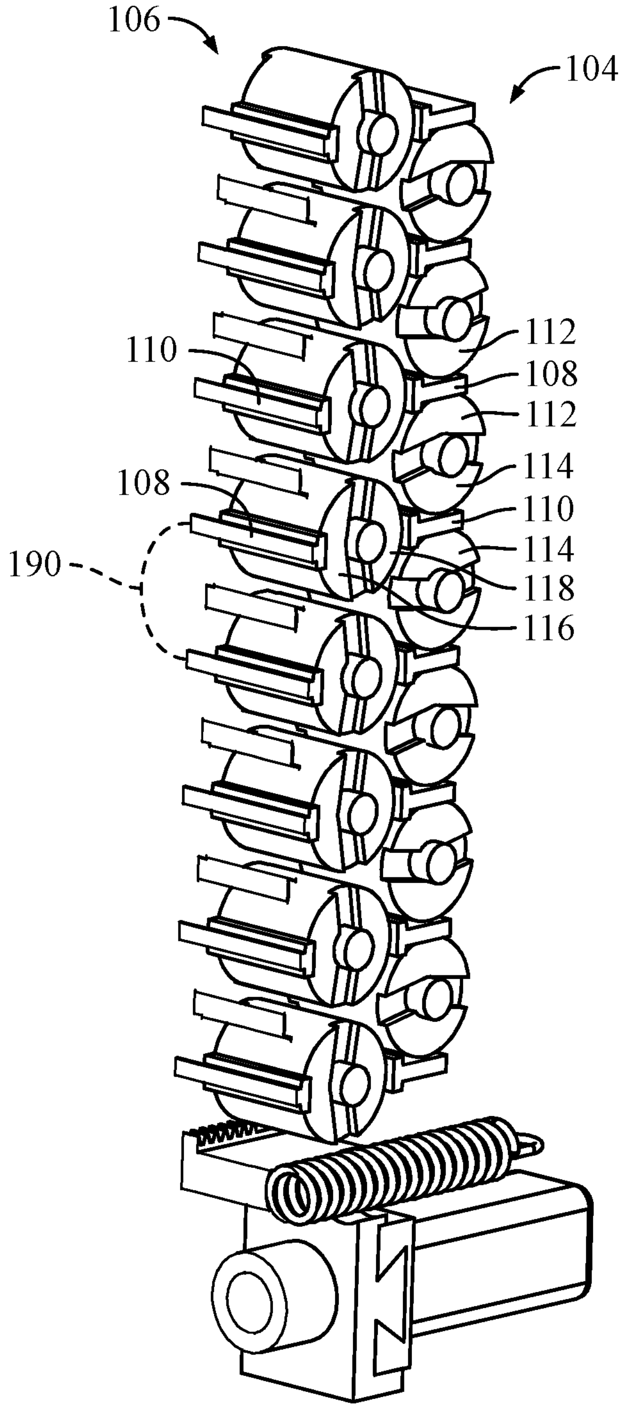
FIG. 6 is an enlarged cross sectional perspective view illustrating the same side as shown in FIGS. 2 and 3.
Figure 7:
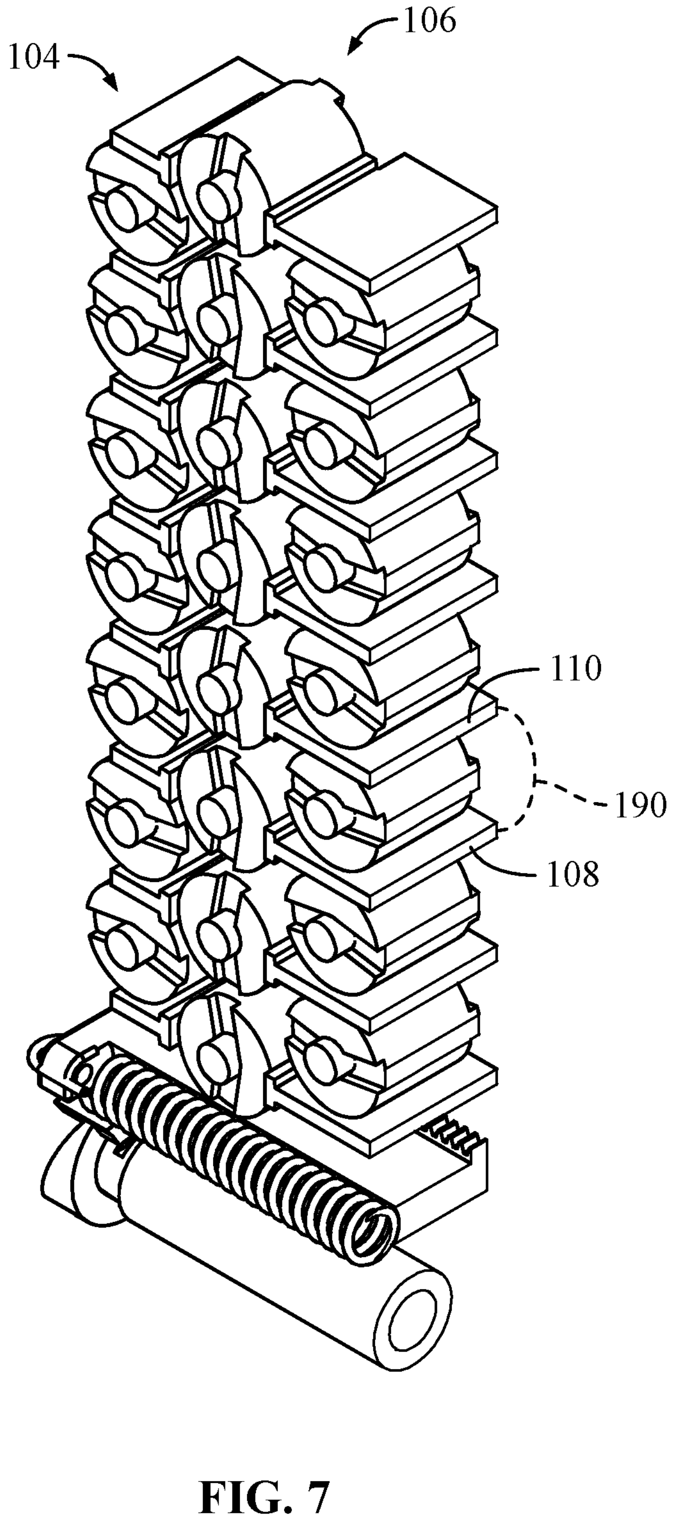
FIG. 7 is an enlarged perspective view at a different cross section compared to FIG. 6 illustrating the same side as shown in FIGS. 2 and 3.
Figure 8:
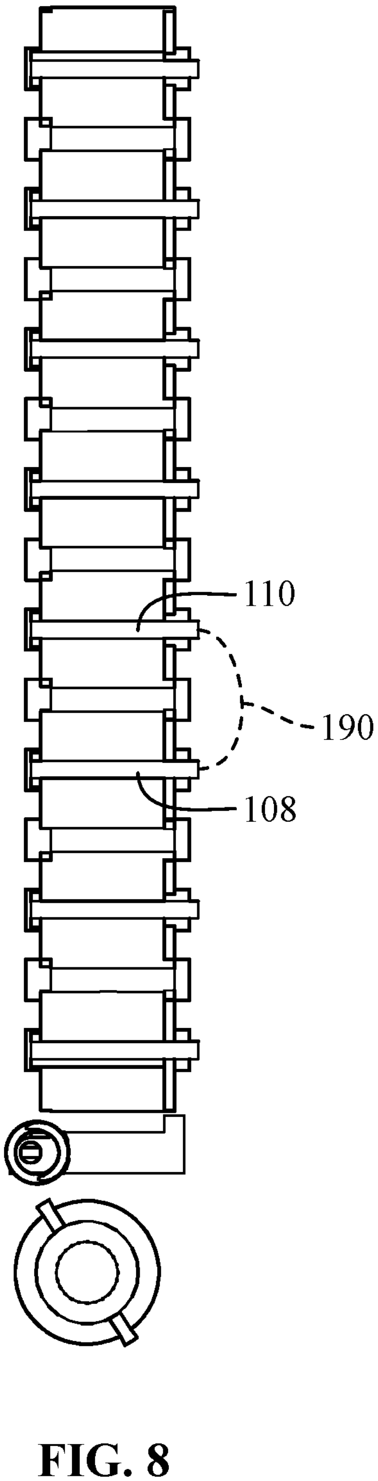
FIG. 8 is a plan view of the cross sectional plane shown in FIG. 7.
Figure 9:
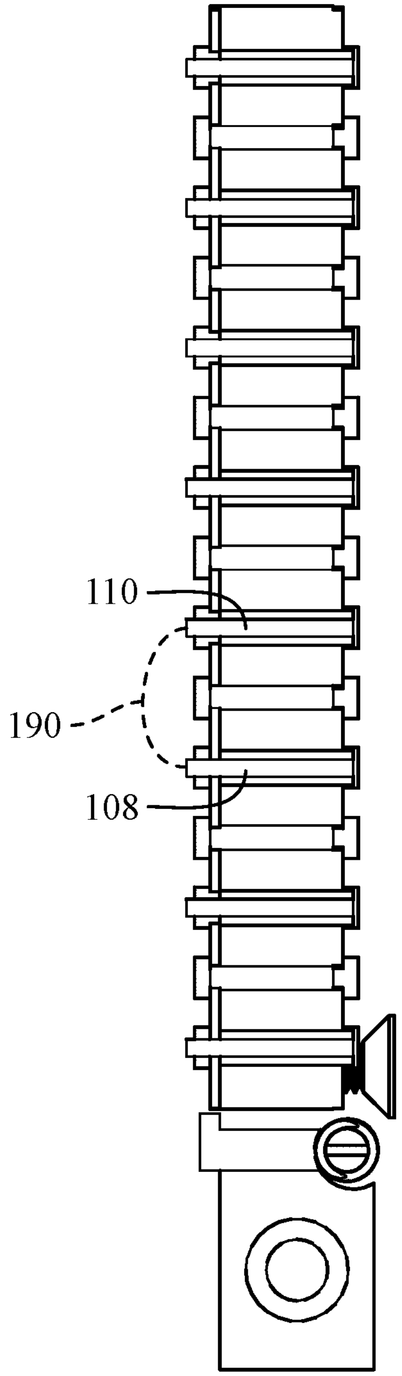
FIG. 9 is the same view shown in FIG. 8 and at a different orientation.
Figure 10:
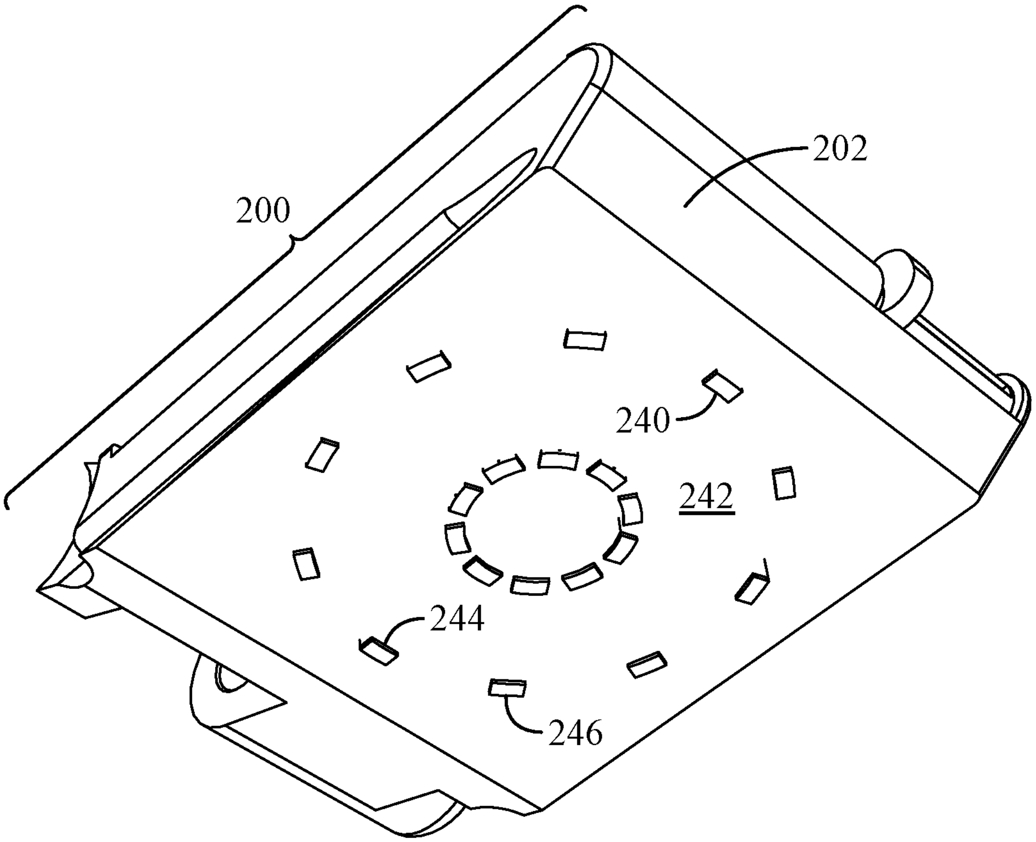
FIG. 10 is a perspective view of a second embodiment of an on-off switchable magnet assembly.
Figure 11:
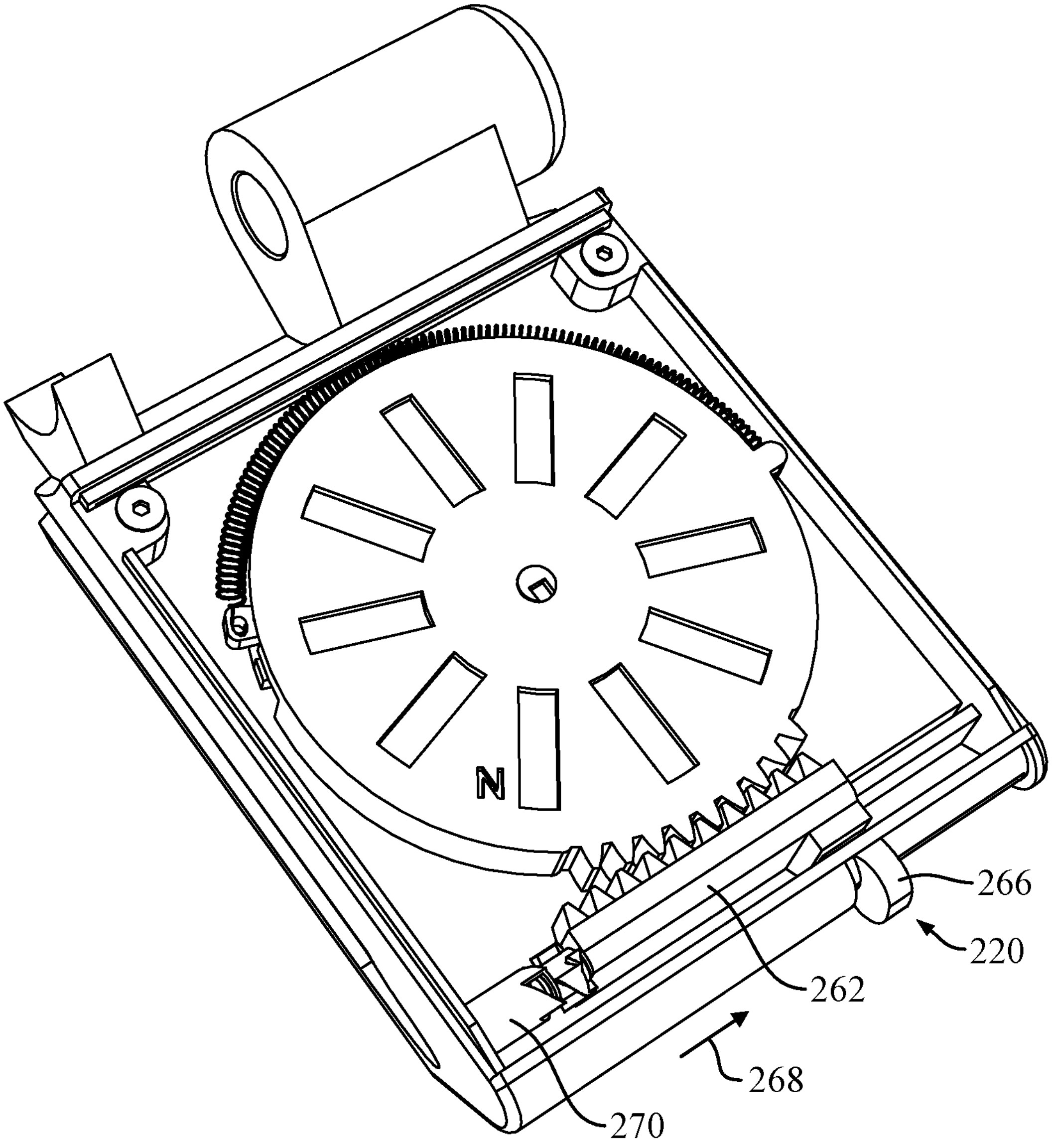
FIG. 11 is a perspective view of the second embodiment on the opposite side with a portion of a housing not shown.

In relation to the first embodiment, referring now to FIG. 5, each of the second magnets 106 may be fixedly attached to a round gear 160. The second magnets 106 and the round gears 160 which are attached to each other rotate in unison so that when the round gear turns, the second magnets 106 rotate. Each of the round gears 160 may be meshed or engaged to an adjacent round gear 160 so that the engaged round gears 160 rotate adjacent round gears 160 and second magnets 106. The last of the round gears 160 may be engaged to a rack 162. The round gears 160 associated with the first row of second magnets 106 may be synced to the round gears 160 associated with the second row of second magnets 106 since the round gears 160 associated with the first and second rows of the second magnets have at least one round gear 160 which is engaged to the rack 162. FIG. 5 illustrates the rack 162 when the assembly is in the on position. To traverse the assembly 100 to the off position, the rack 162 may be traversed in a linear direction as shown by arrow 164. In doing so, the rack 162 rotates all of the round gears 160. The rack is traversed in the direction of arrow 164 until the round gears 160 and thus the second magnets 106 are rotated 180 degrees. To traverse the assembly 100 to the on position, the rack 162 may be traversed in a linear direction as shown by arrow 168. When one of the second magnets 106 rotates a certain angular rotation, the other second magnets 106 rotates to the same degree. For example, when one of the second magnets 106 rotates 180 degrees, the other second magnets 106 rotates 180 degrees.

Figure 12:
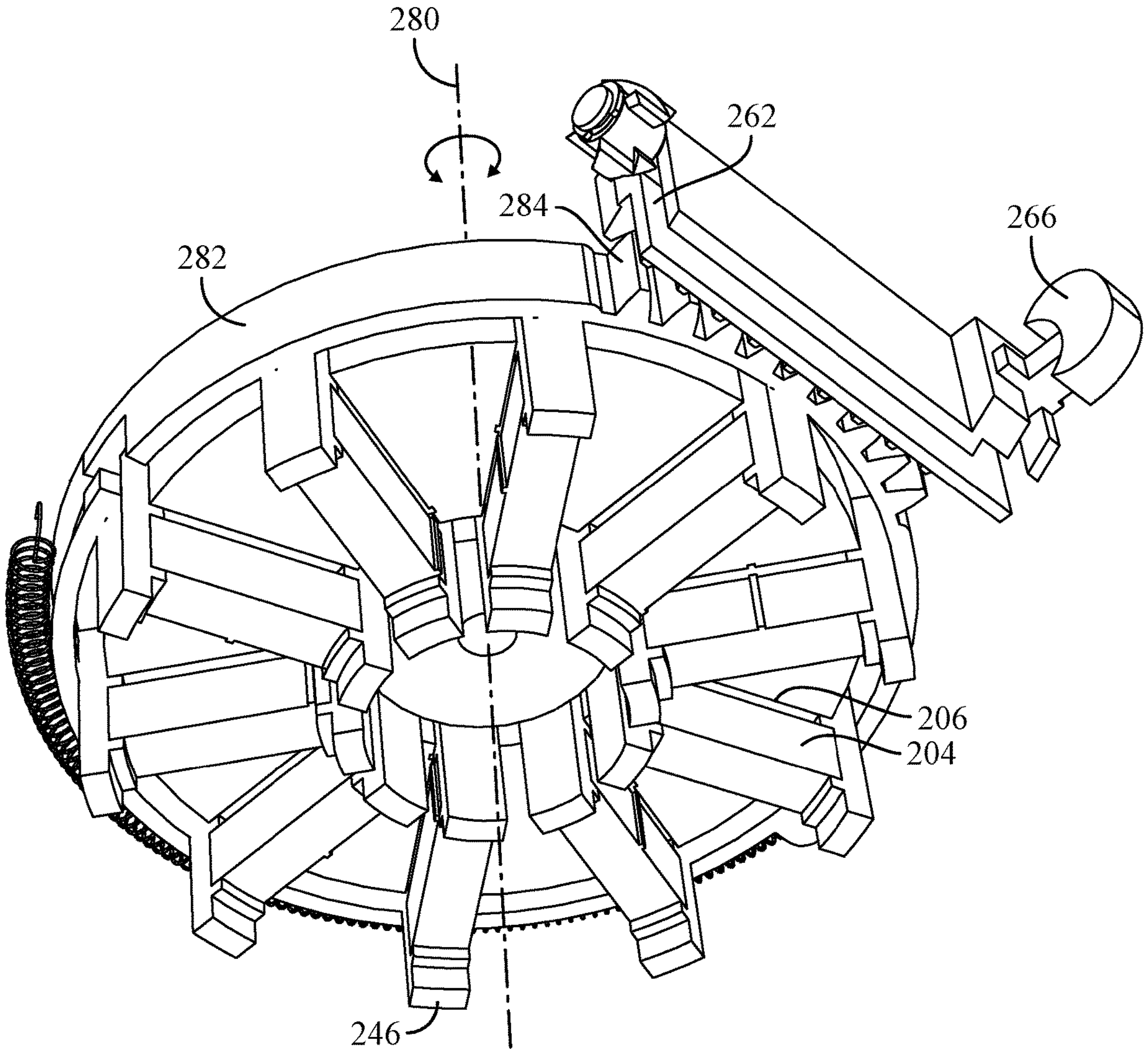
FIG. 12 is a perspective view of the second embodiment showing a subframe for rotating the second magnets.

In relation to the second embodiment, referring now to FIG. 12, each of the second magnets 206 (see FIGS. 13 and 14) may be rotationally attached to a subframe 282. The subframe 282 may have a plurality of teeth 264. The teeth 264 meshes or engages the rack 262. The biasing member 222 may bias the assembly in the off position. As shown in FIG. 14, the user may push the button 266 of the locking mechanism 220 in the direction of arrow 264. The rack is attached to the locking mechanism 220 so that when the button 266 is pushed in the direction of arrow 264, the rack 262 rotates the subframe 282 about central axis 280 so that the second magnets 206 are traversed from the off position to the on position.

Figure 17:
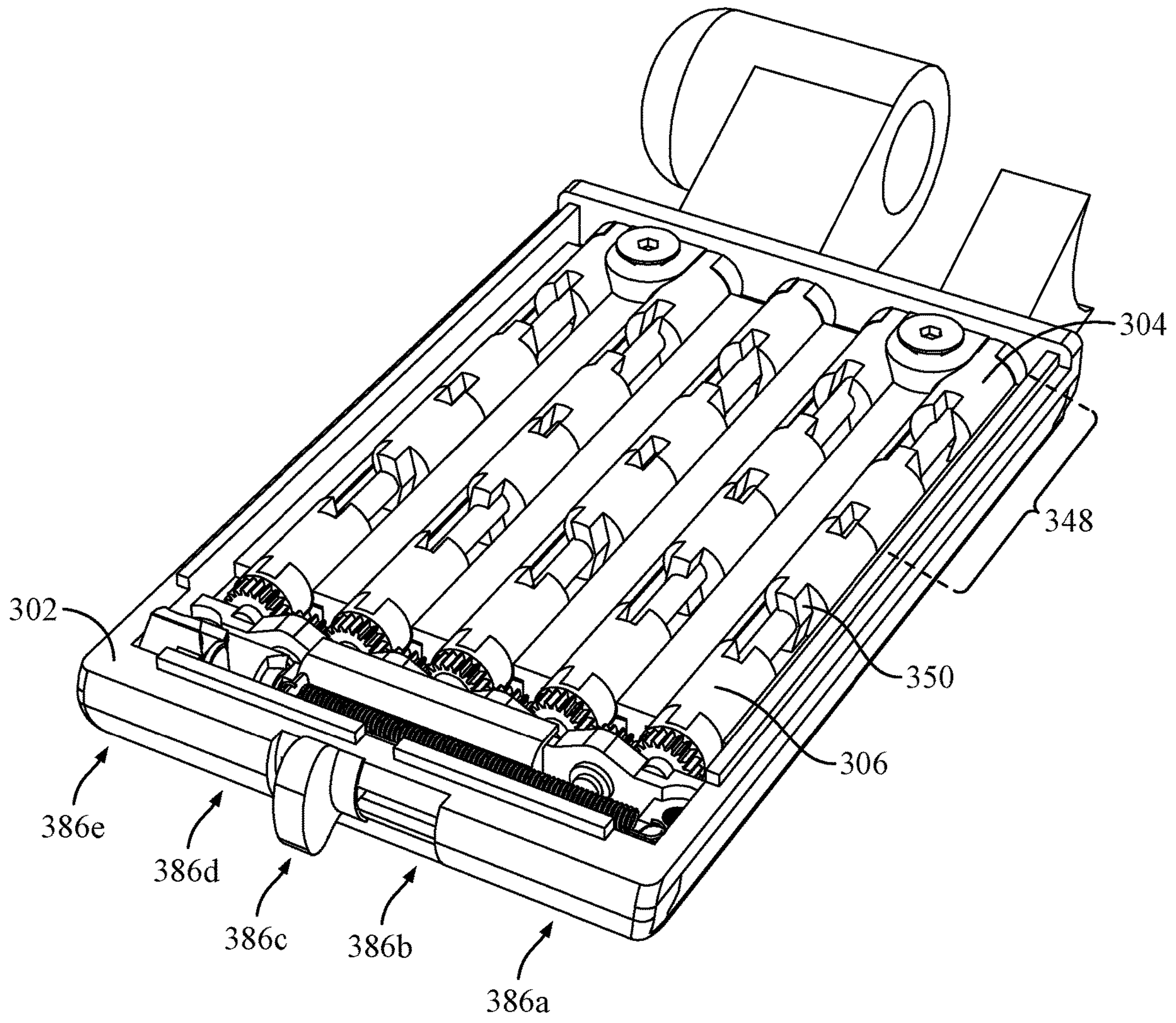
FIG. 17 shows the same view as that in FIG. 16 and a few of the first and second magnets not shown to show markings that indicate orientations for the north and south (e.g., first and second) poles of the magnets.
Figure 18:
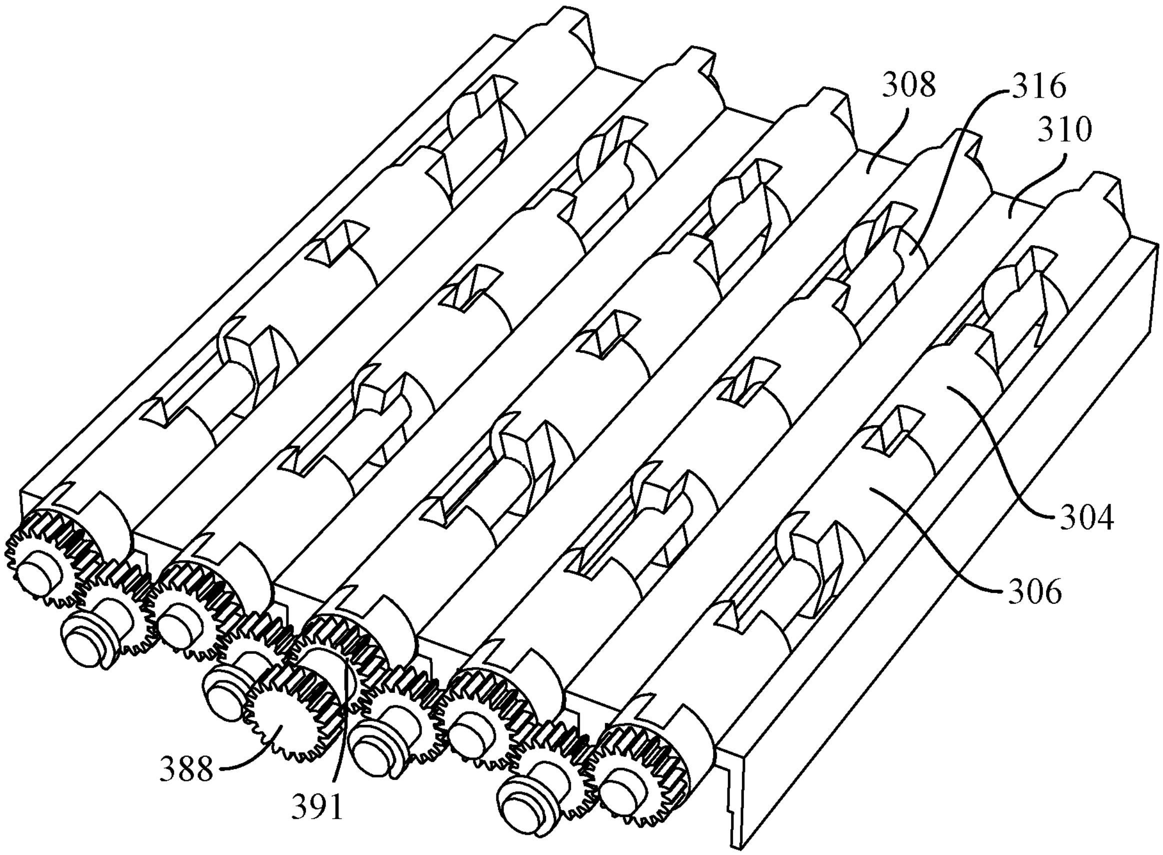
FIG. 18 shows the same view as that in FIG. 17 and the housing is not shown to illustrate gears for rotating the second magnets to traverse the assembly between the on and off positions.

In relation to the third embodiment, referring now to FIGS. 17 and 18, the second magnets 306 are rotationally attached to the housing 302. The second magnets 306 are stacked into five columns 386*a-e*. Each column 386*a-e* of second magnets 306 rotate in unison. Moreover, each column 386*a-e* is attached to a pinion which in turn is connected to the pins associated with the other columns 386*a-e*. When one column 386*a-e* rotates, the other columns 386*a-e* rotates in unison to the same degree. For example, when one column 386*a-e* rotates 180 degrees, the other columns 386*a-e* rotate 180 degrees. To traverse the assembly 300 from the off position (see FIG. 20) to the on position (see FIGS. 16 and 17), the user may push button 366 in the direction of arrow 364. In doing so, a rack 362 is pushed in the same direction. The rack 362 is engaged to pinion 388, as shown in FIG. 18. The pinion 388 is fixedly attached to pinion 391. The pinion 391 is attached to all of the other pinions which drive the columns 386*a-e* of second magnets 306. The columns 386*a-e* of the second magnets 306 rotate to the same degree of each other. For example, if the column 386*a* of second magnets 306 rotates 180 degrees, the columns 386*b-e* of the second magnets rotates 180 degrees.

Figure 22:
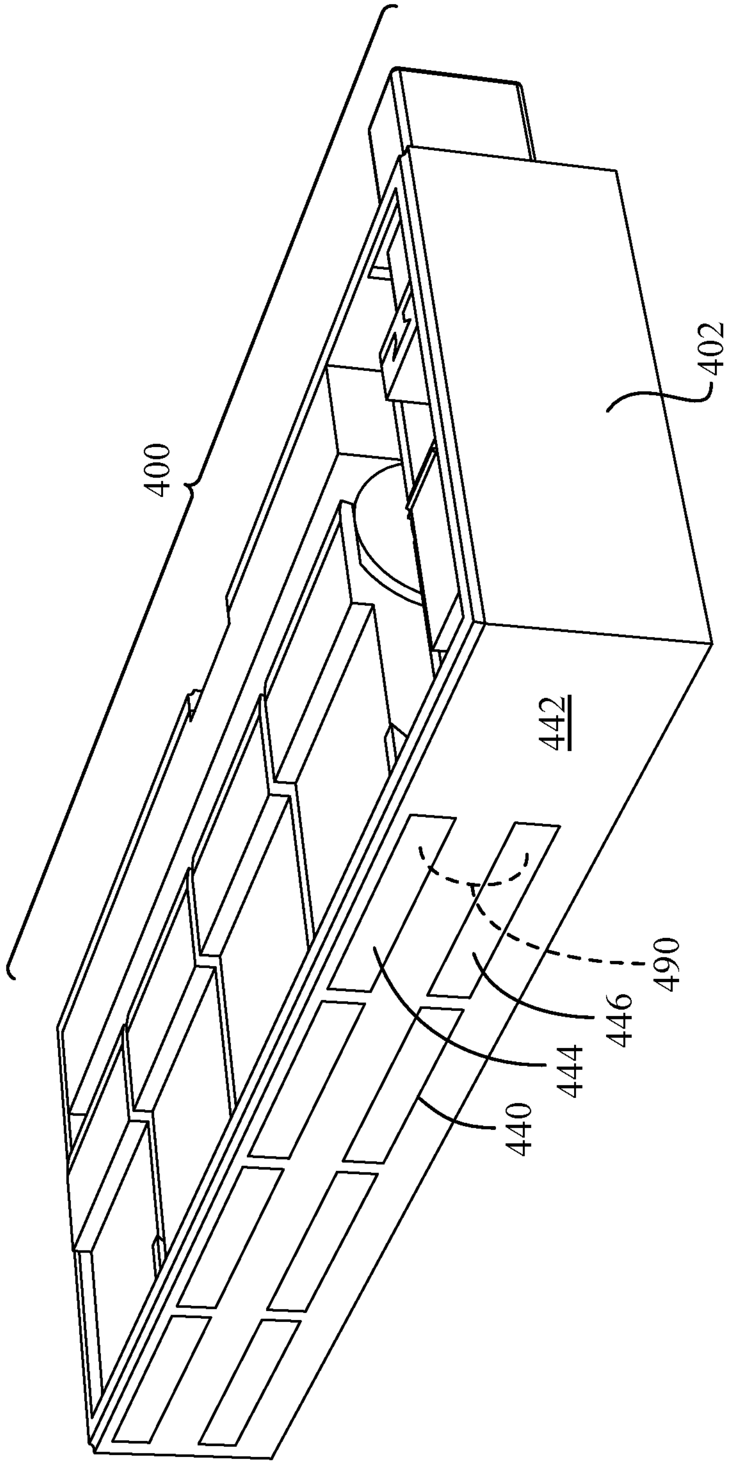
FIG. 22 is a perspective view of a fourth embodiment of an on-off switchable magnet assembly with a portion of the housing not shown.
Figure 23:
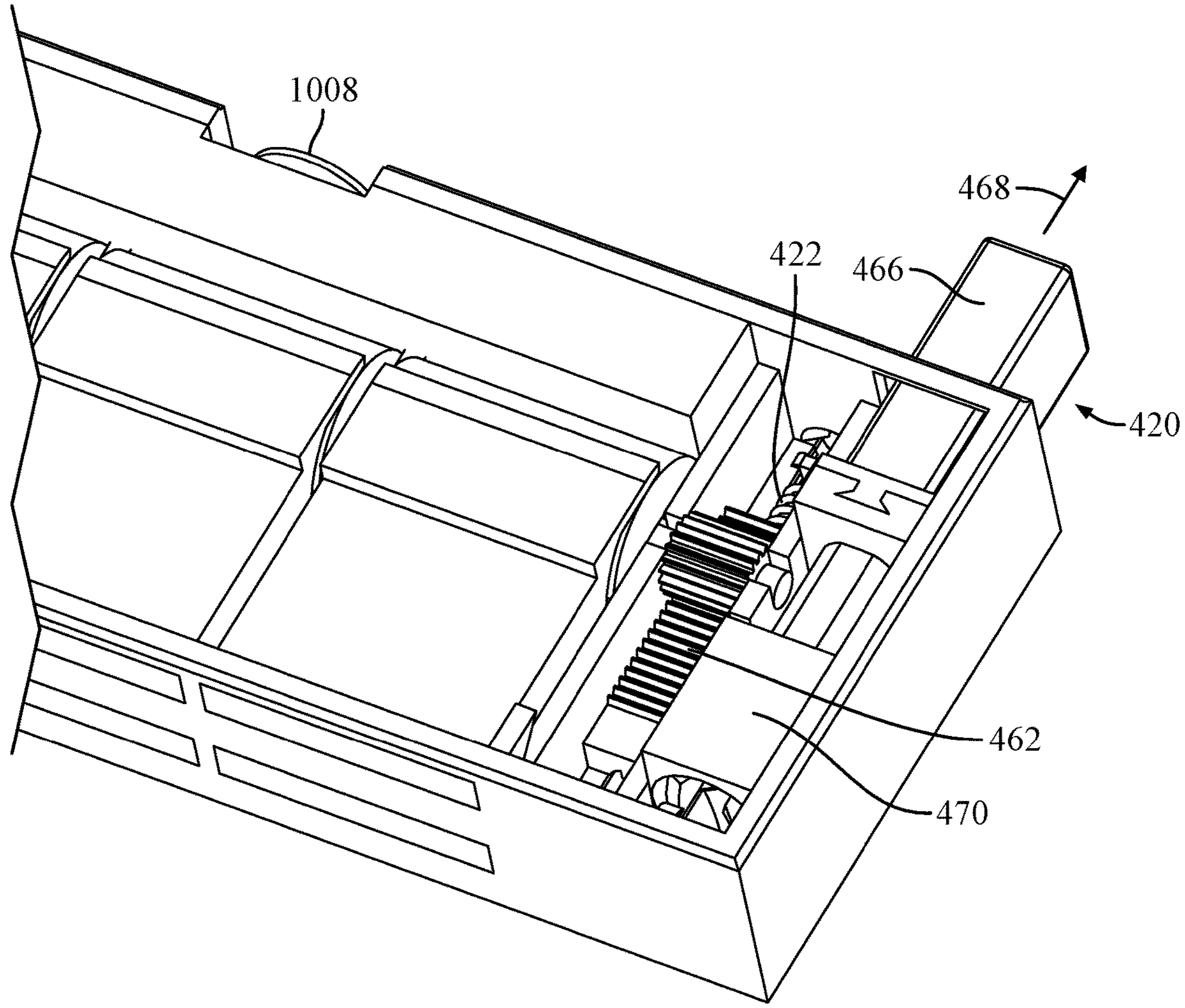
FIG. 23 is a perspective view of the fourth embodiment on an opposite side compared to FIG. 22 with a portion of the housing not shown.

In relation to the fourth embodiment, referring now to FIG. 27, the second magnets 406 are rotationally attached to the housing 402 (see FIG. 22). The second magnets 406 are shown as being exploded away from the first and second ferrous members 408, 410. All of the second magnets are fixedly attached to the pinion 488. All of the second magnets 406 rotate in unison and to the same degree as each other. To traverse the assembly from the off position (see FIG. 27) to the on position (see FIG. 24), the user pushes the button 466 in the direction of arrow 464. In doing so, the button 466 is attached to the rack 462 which is engaged to the pinion 488. The pinion turns and rotates the second magnets.

Figure 29:
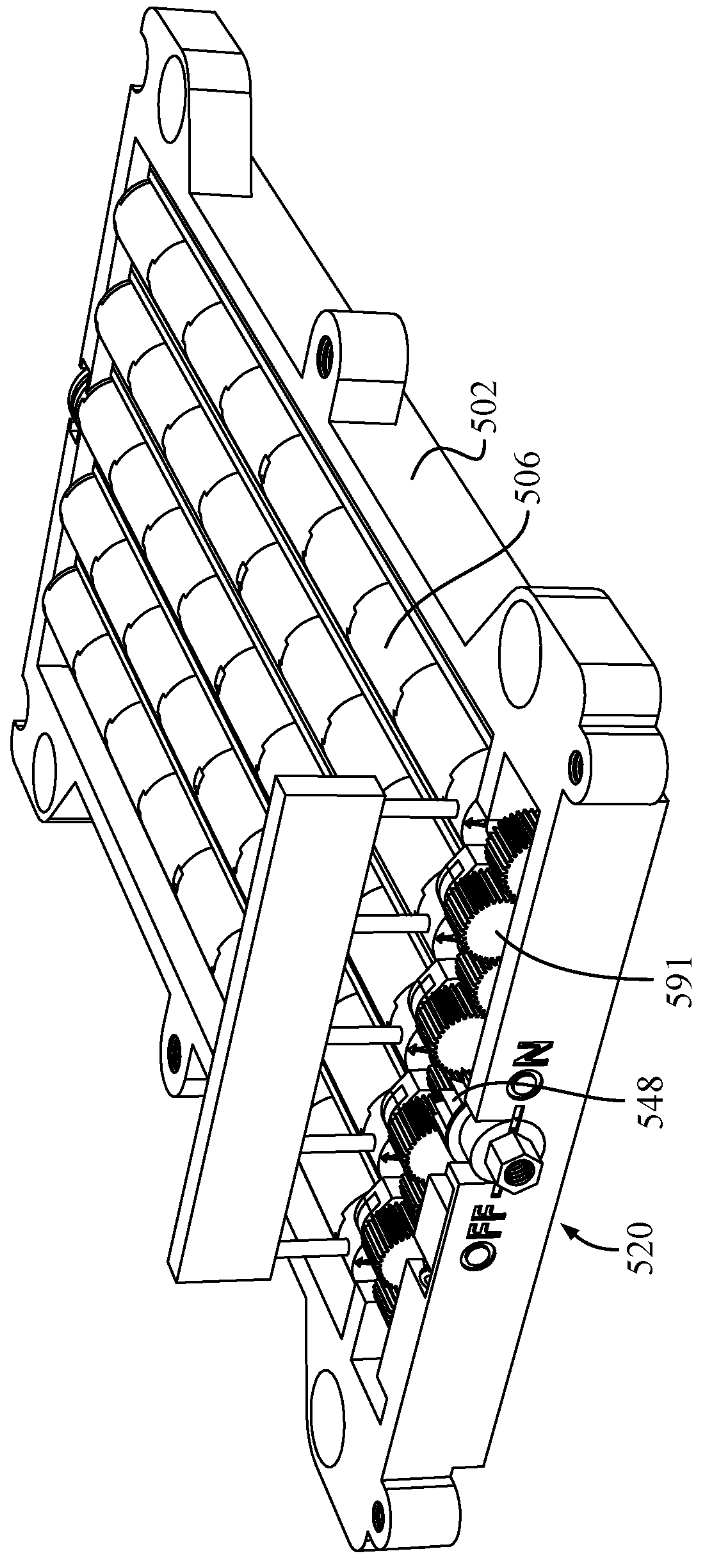
FIG. 29 is a perspective view of the fifth embodiment on an opposite side compared to FIG. 28 with a portion of the housing not shown.
Figure 30:
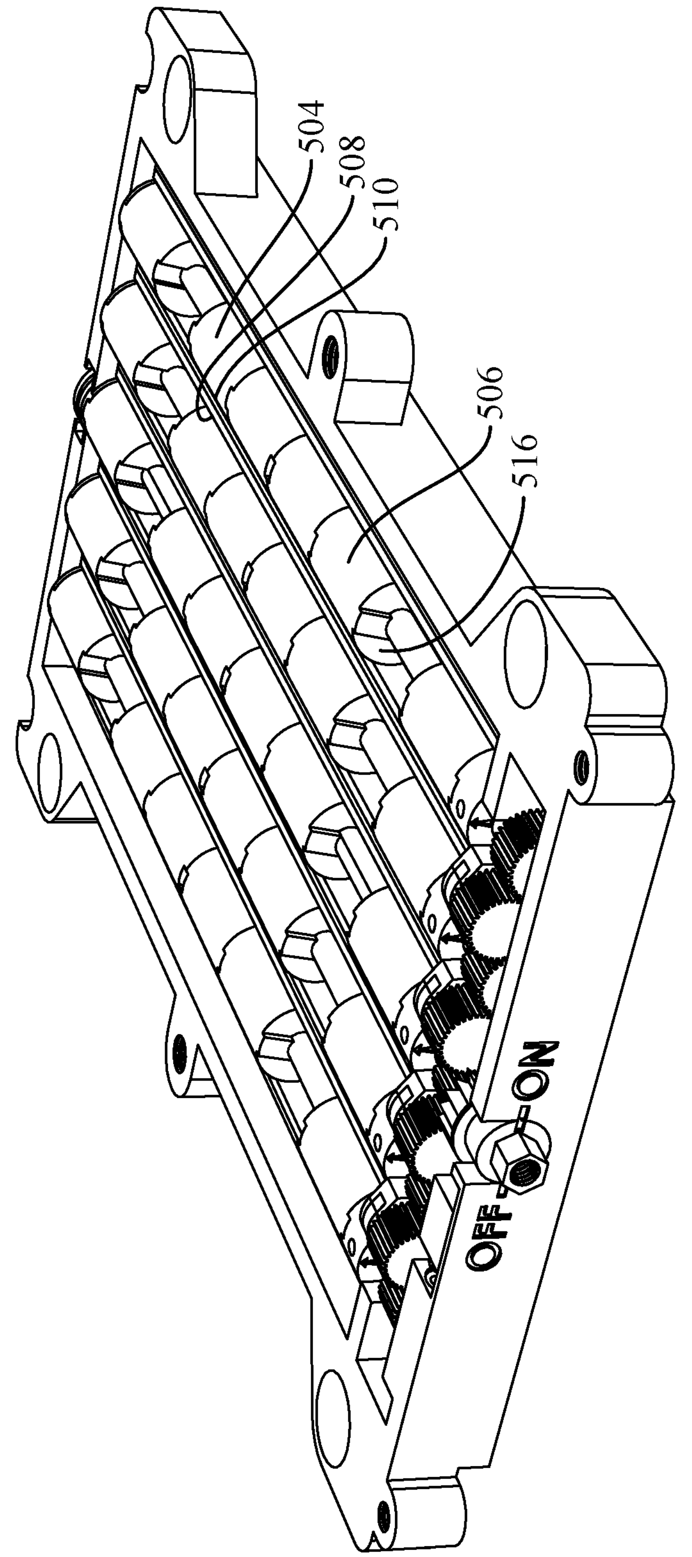
FIG. 30 is the same view shown in FIG. 29 and some of the first and second magnets not shown and the assembly and the second magnets in an on position.

In relation to the fifth embodiment, referring now to FIG. 29, the second magnets 506 are rotationally attached to the housing 502. The mechanism to rotate the second magnets 506 is identical to the third embodiment except that instead of a rack and pinion set up, the pinion 591 may be rotated with a wrench (e.g., allen wrench or hex wrench).

Figure 36:
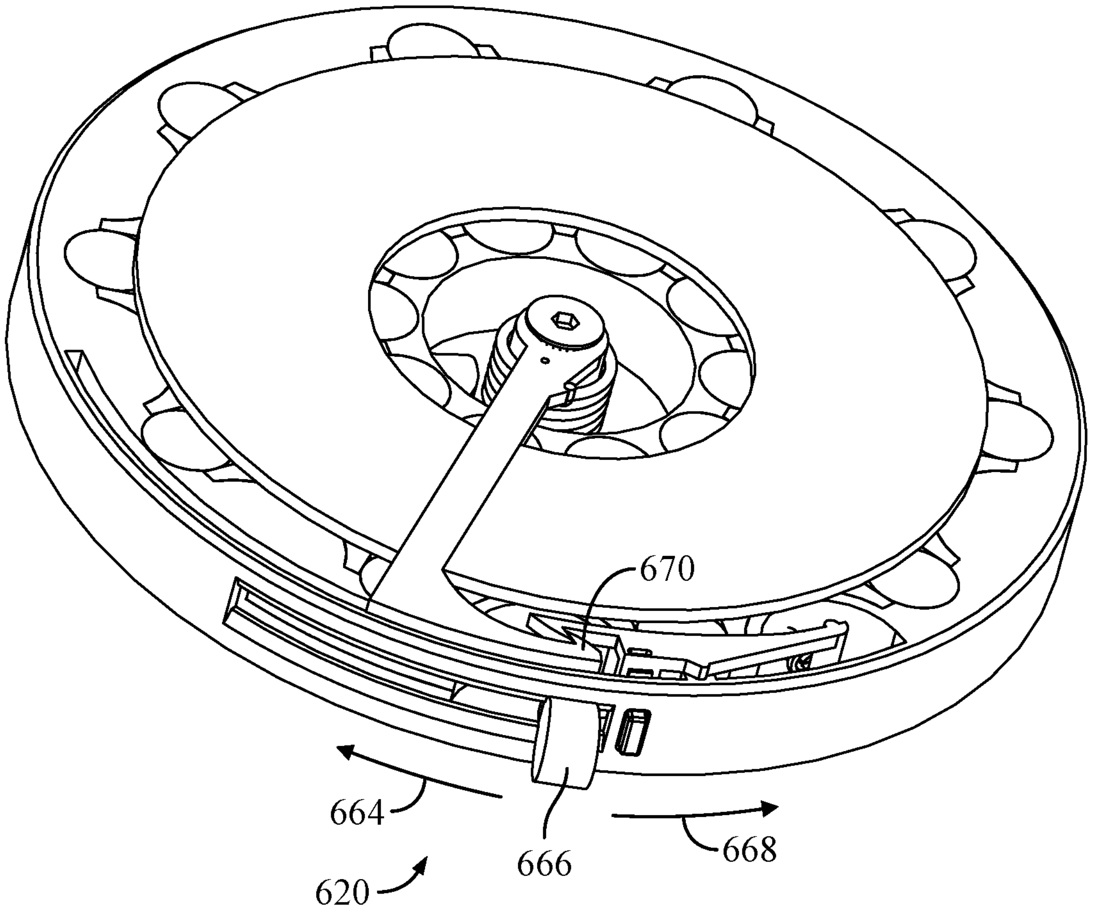
FIG. 36 is a perspective view of the sixth embodiment on an opposite side compared to FIG. 35 with a portion of the housing not shown.
Figure 37:
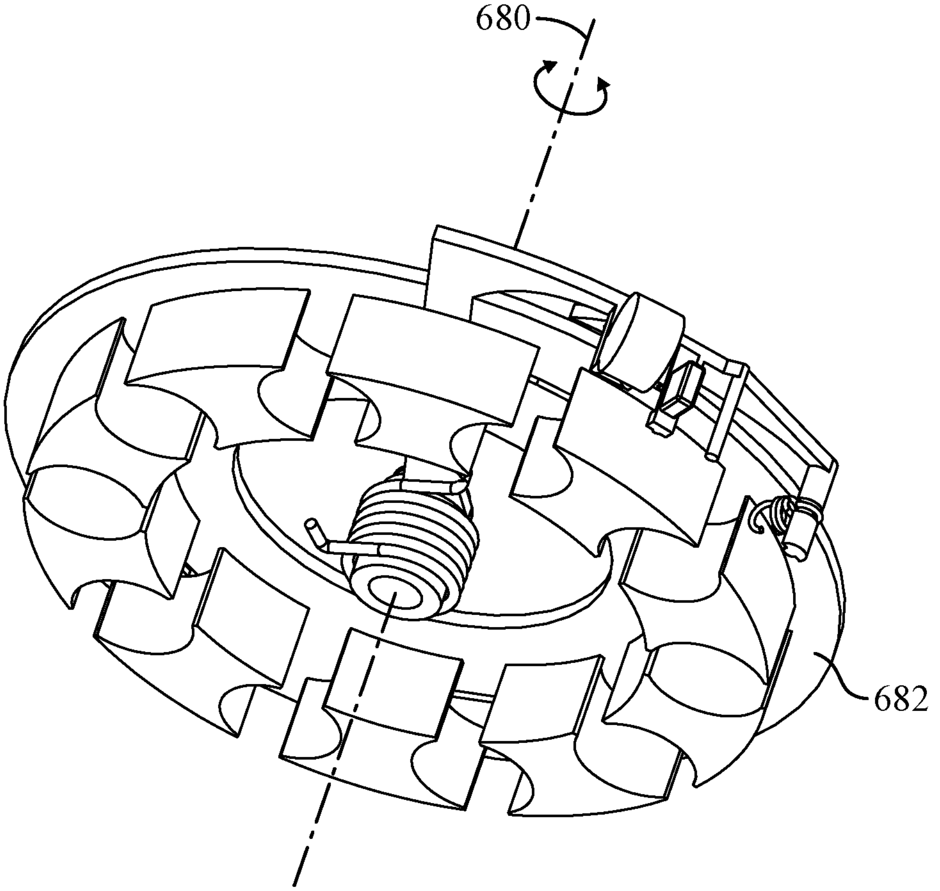
FIG. 37 is a perspective view of a subframe to which second magnets are attached to rotate the second magnets between on and off positions.

In relation to the sixth embodiment, referring now to FIG. 45, each of the second magnets 606 may be rotationally attached to a subframe 282 (see FIG. 37). The subframe 682 may rotate about axis 680. A biasing member 622 (see FIG. 42) may bias the assembly 600 to the off position. As shown in FIG. 36, the user may push the button 666 of the locking mechanism 620 in the direction of arrow 664. The button 666 is attached to the subframe 682 so that when the button 266 is pushed in the direction of arrow 664, the subframe 282 is rotated about central axis 680 so that the second magnets 206 are traversed from the off position to the on position.

Figure 21:
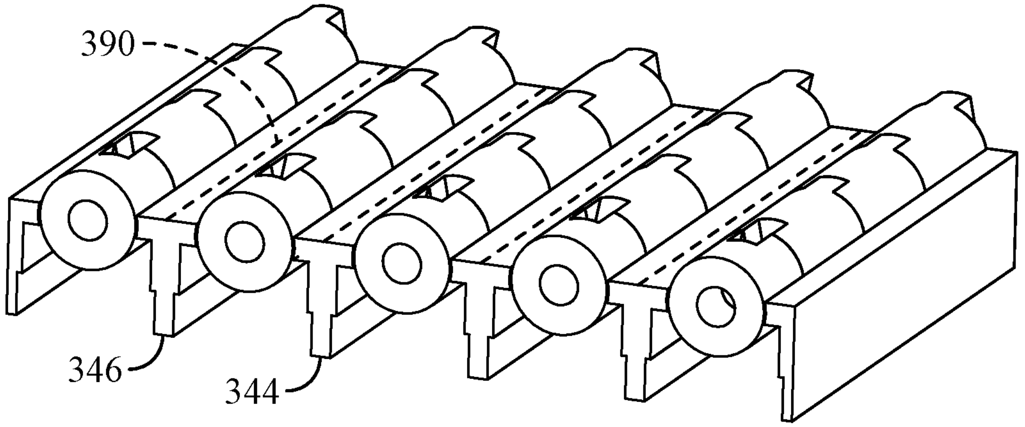
FIG. 21 is a cross sectional view of the assembly shown in FIG. 20.
Figure 34:
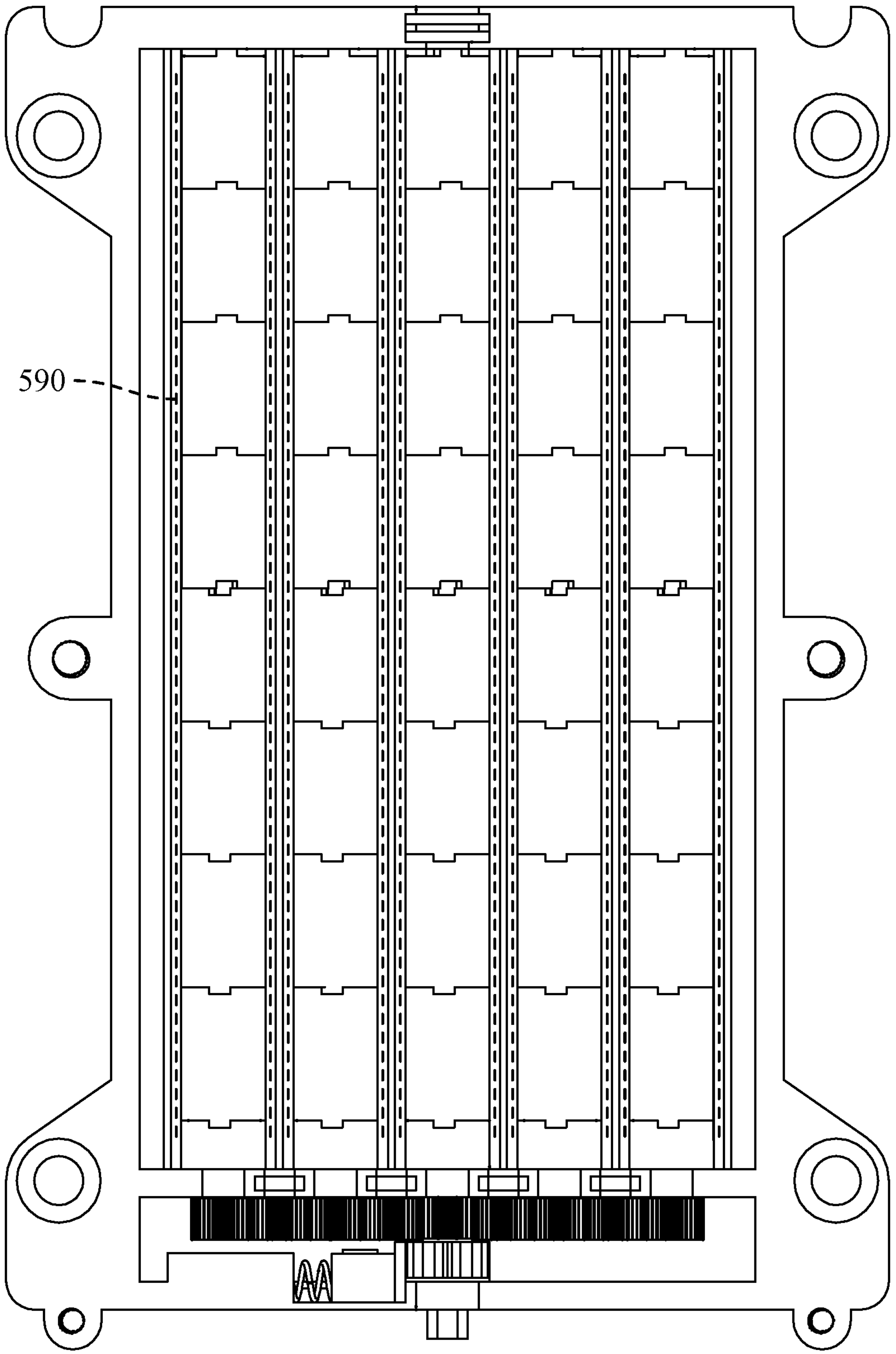
FIG. 34 is top view of FIG. 33 with the second magnets and the assembly in the off position.
Figure 35:
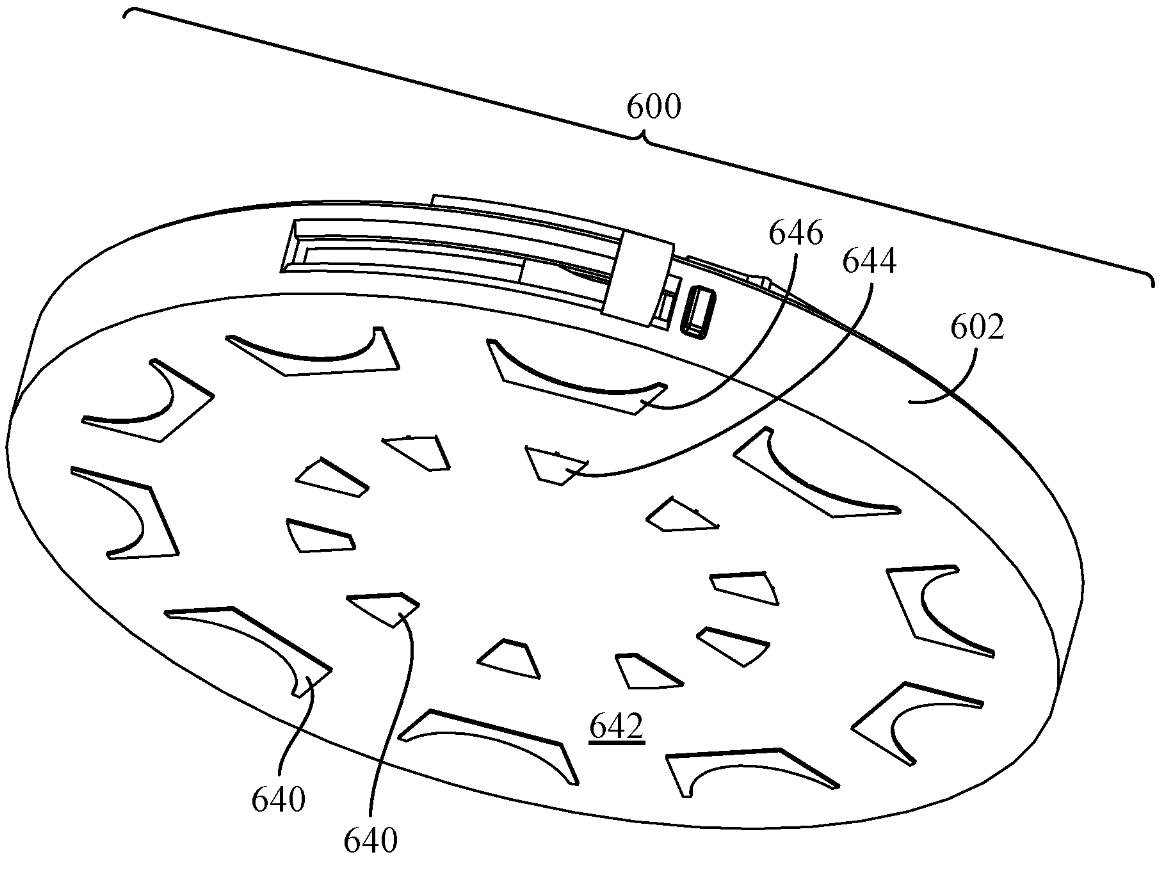
FIG. 35 is a perspective view of a sixth embodiment of an on-off switchable magnet assembly.

FIG. 2 for the first embodiment, FIG. 14 for the second embodiment, FIGS. 20 and 21 for the third embodiment, FIG. 27 for the fourth embodiment, FIGS. 33 and 34 for the fifth embodiment and FIG. 45 for the sixth embodiment illustrate the assembly 100-600 in the off-position and the orientations of the second magnets 106-606 when the assembly 100-600 is in the off position. Each of the first and second ferrous members 108-608, 110-610 are associated with first and second poles 112-612, 114-616, 116-616, 118-618 of the first and second magnets 104-604, 106-606. By way of example and not limitation, the first poles of 112-612 of the first magnets 104-604 may be immediately adjacent to or closest to the first ferrous members 108-608. Also, the second poles 114-614 of the first magnets 104-604 may be immediately adjacent to or closest to the second ferrous members 110-610.

The second poles 118-918 of the second magnets 106-606 are associated with (i.e., immediately adjacent to or closest to) the first ferrous members 108-608. Also, the first poles 116-616 of the second magnets 106-606 are associated with (i.e., immediately adjacent to or closest to) the second ferrous members 110-610. When this configuration exists (i.e., off position), the flux from the first poles of the first magnets 104-604 is flowed through, attracted to, or matched to the flux of the second poles 118-618 of the second magnets 106-606 via the first ferrous members 108-608. The flux predominately tends to stay within the first ferrous members 108-608. Also, the flux from the second poles of the first magnets 104-604 is flowed through, attracted to, or matched to the flux of the first poles 116-616 of the second magnets 106-606 via the second ferrous members 110-610. The flux predominantly tends to stay within the second ferrous members 110-610.

The flux from these first and second magnets 104-604, 106-606 are contained within the first and second ferrous members 108-608, 110-610. The flux, at least most of the flux, does not jump out of the ferrous members 108-608, 110-610 to immediately the adjacent opposite poled ferrous member.

Figure 3:
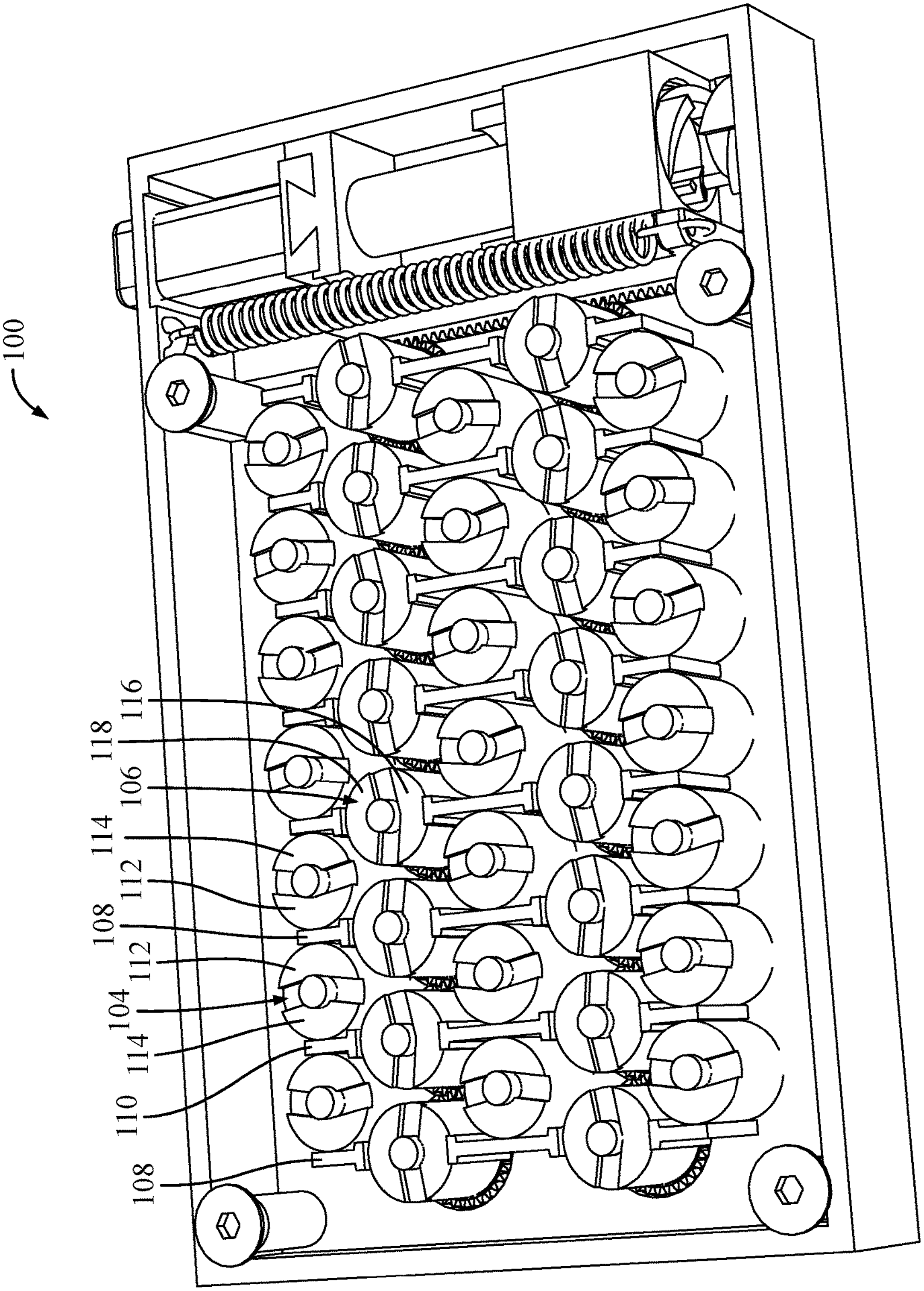
FIG. 3 is the same view as shown in FIG. 2 but when the first and second magnets are in the on position.
Figure 4:
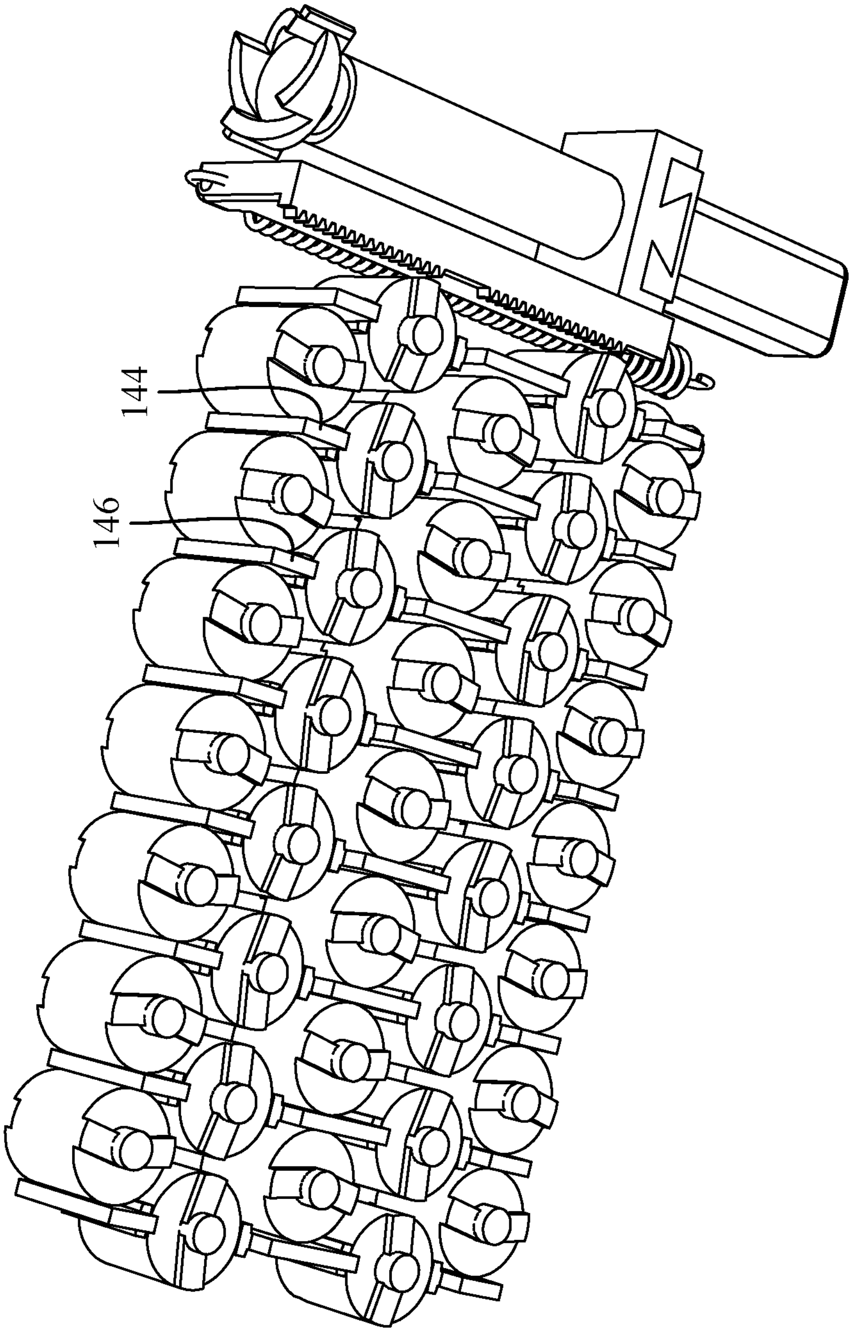
FIG. 4 is the same view as shown in FIG. 1 with the cover not shown.

Referring now to FIG. 3, 13, 18, 25, 30, 41, the orientations of the second magnets 106-606 when the assembly 100-600 is in the on position are shown. The first and second poles of the first magnets 104-604 (see FIG. 24 for 404) remain in the same position as when the assembly was in the off position. To traverse the assembly 100 from the off position to the on position, the locking mechanism was traversed so that the second magnets are moved into the on position. In the on position, the second poles 118-618 of the second magnets 106-606 are associated with (i.e., immediately adjacent to or closest to) the second ferrous members 110-610. Also, the first poles 116-616 of the second magnets 106-606 are associated with (i.e., immediately adjacent to or closest to) the first ferrous members 108-608.

Figure 13:
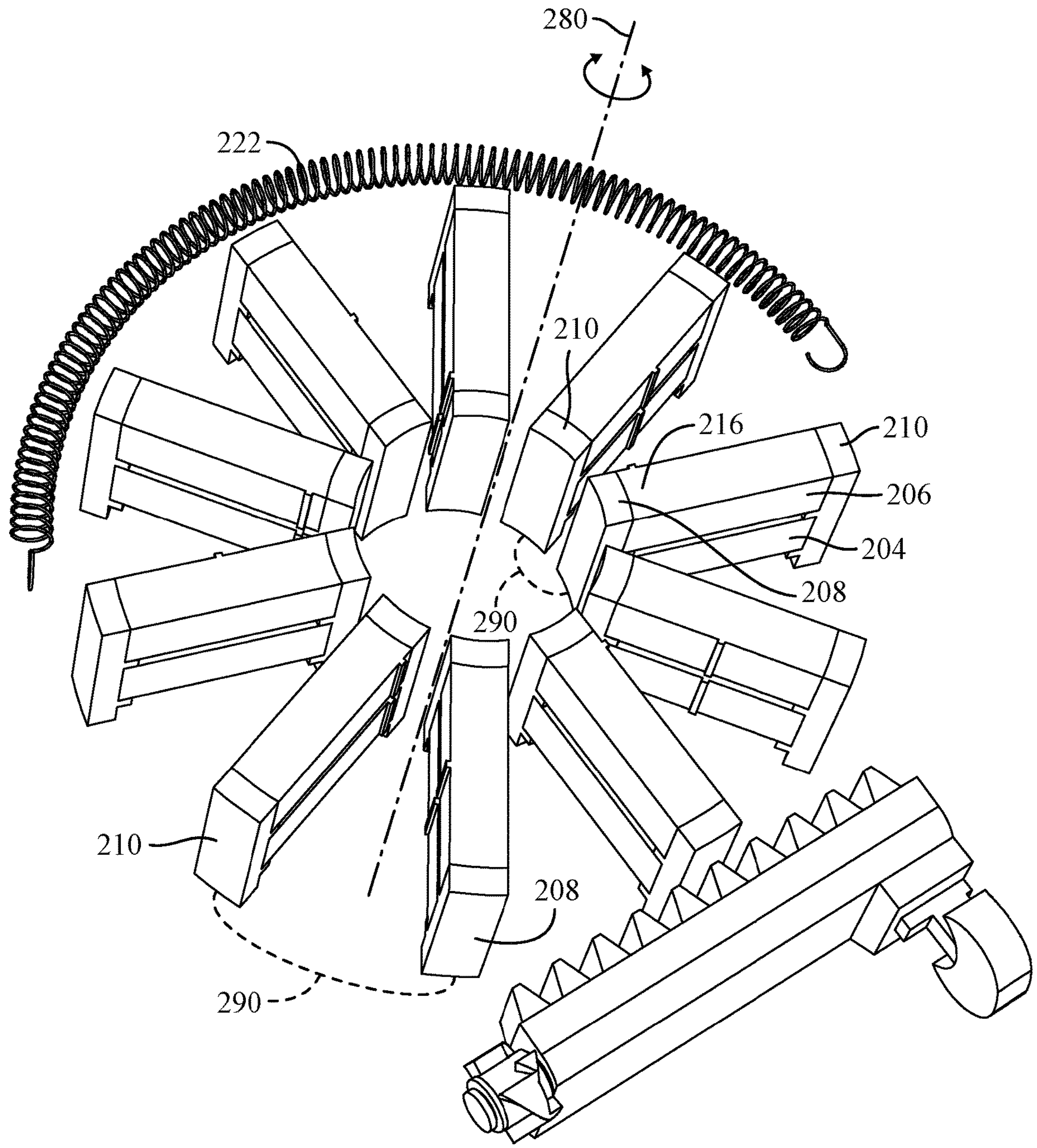
FIG. 13 is a perspective view of the second embodiment not showing the subframe and the first and second magnets in an on position.
Figure 19:
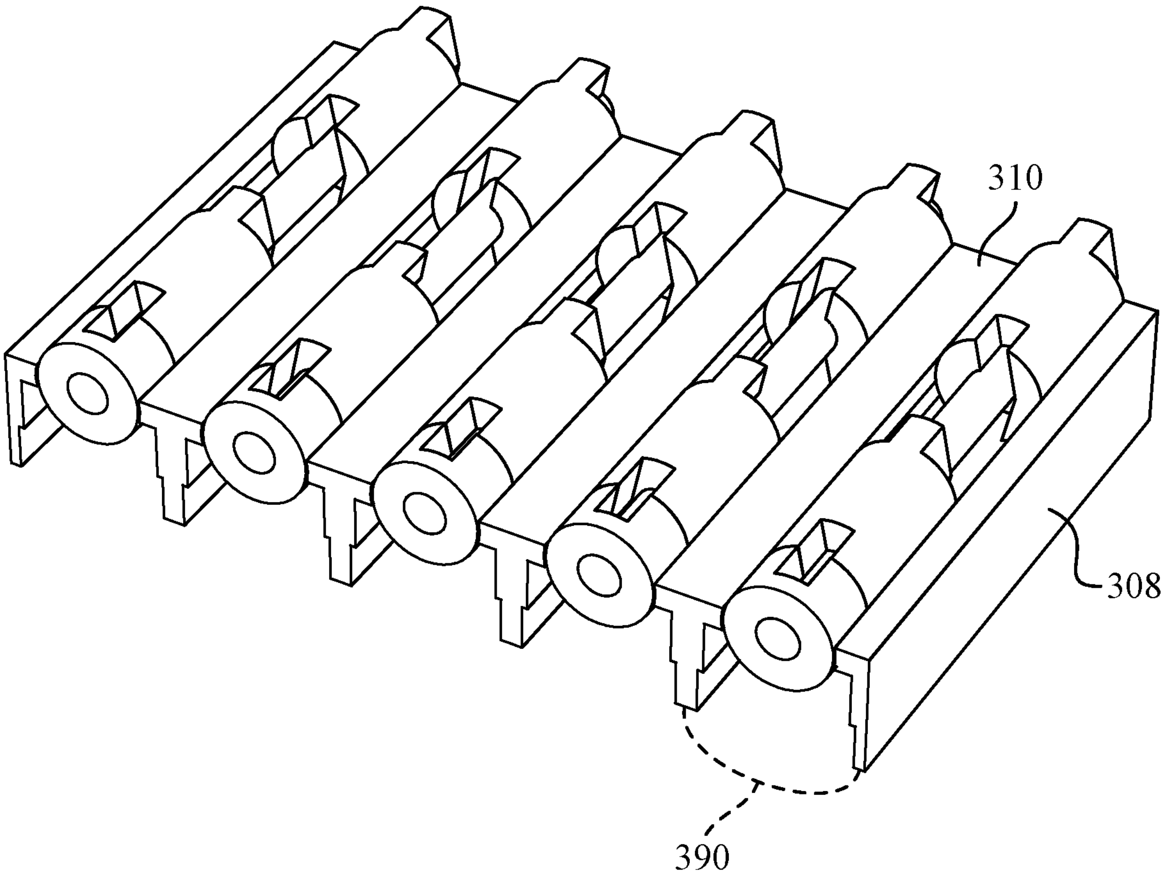
FIG. 19 is a cross sectional view of the assembly shown in FIG. 18.
Figure 24:
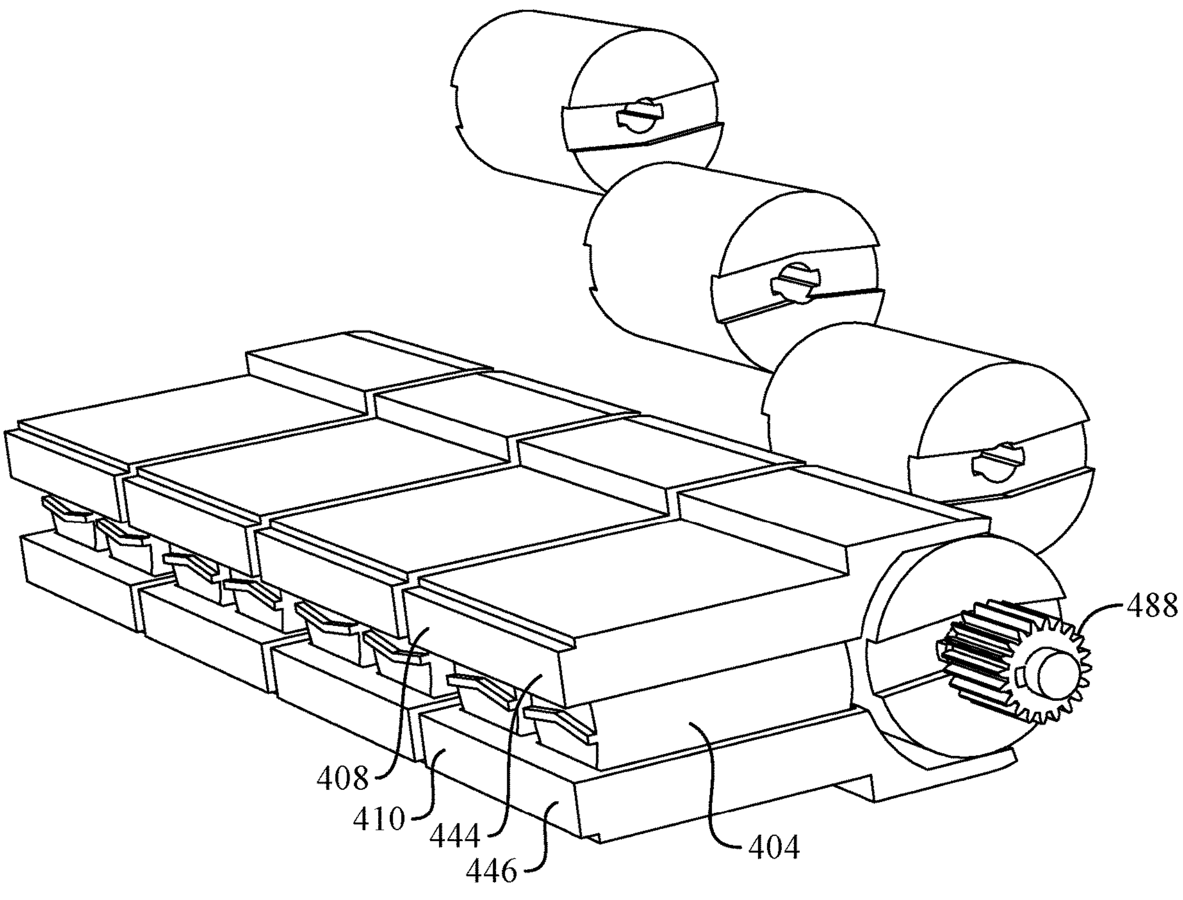
FIG. 24 is a perspective view of the assembly shown in FIG. 22 within the second magnets and the assembly in an on position without the housing and the second magnets exploded.
Figure 31:
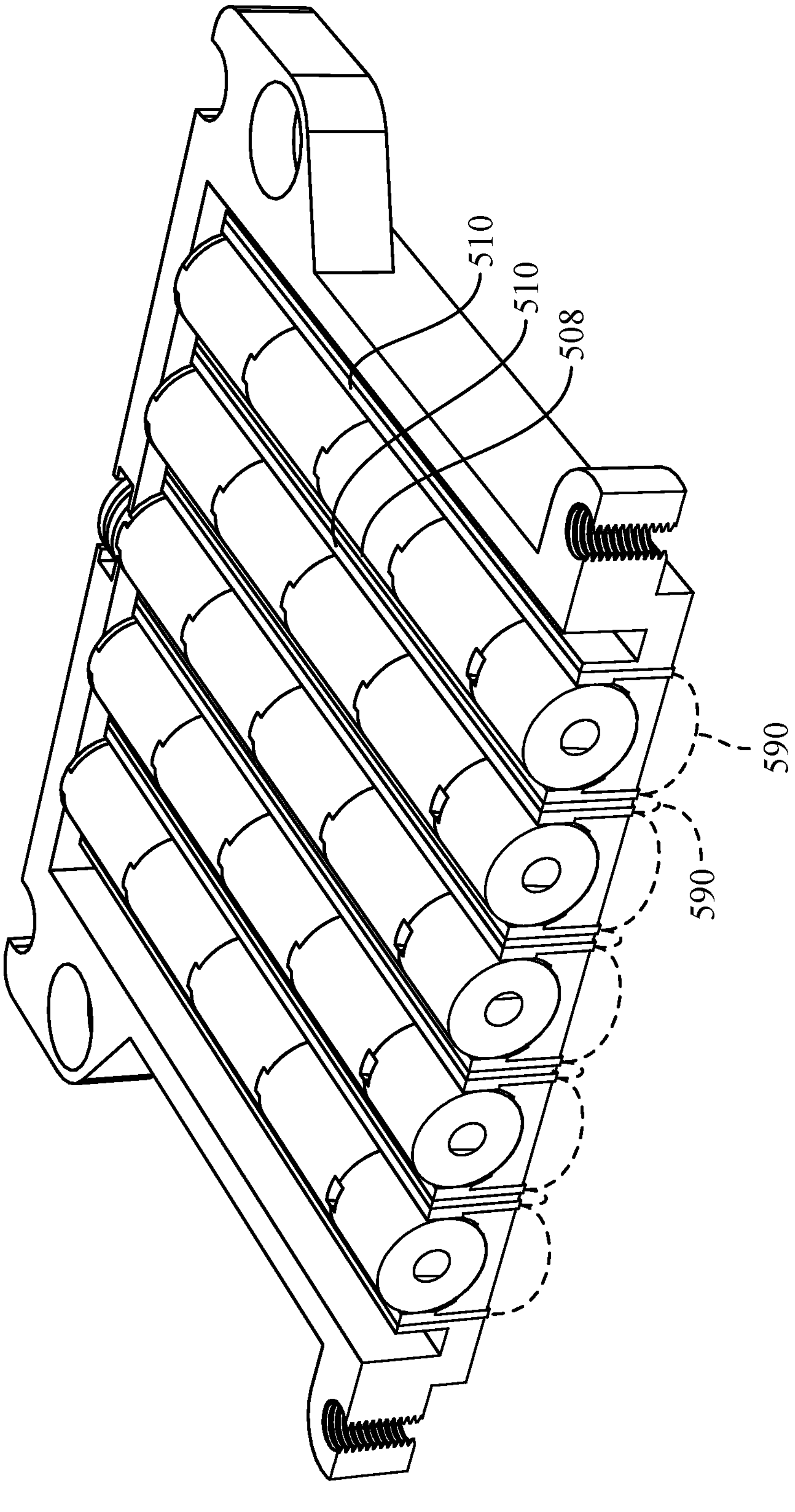
FIG. 31 is a cross sectional view of FIG. 29.
Figure 32:
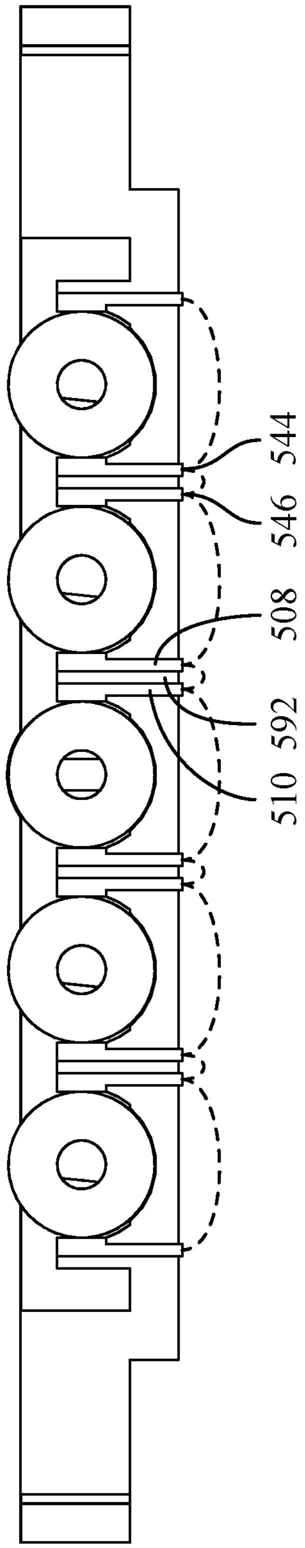
FIG. 32 is a front view of FIG. 31.
Figure 42:
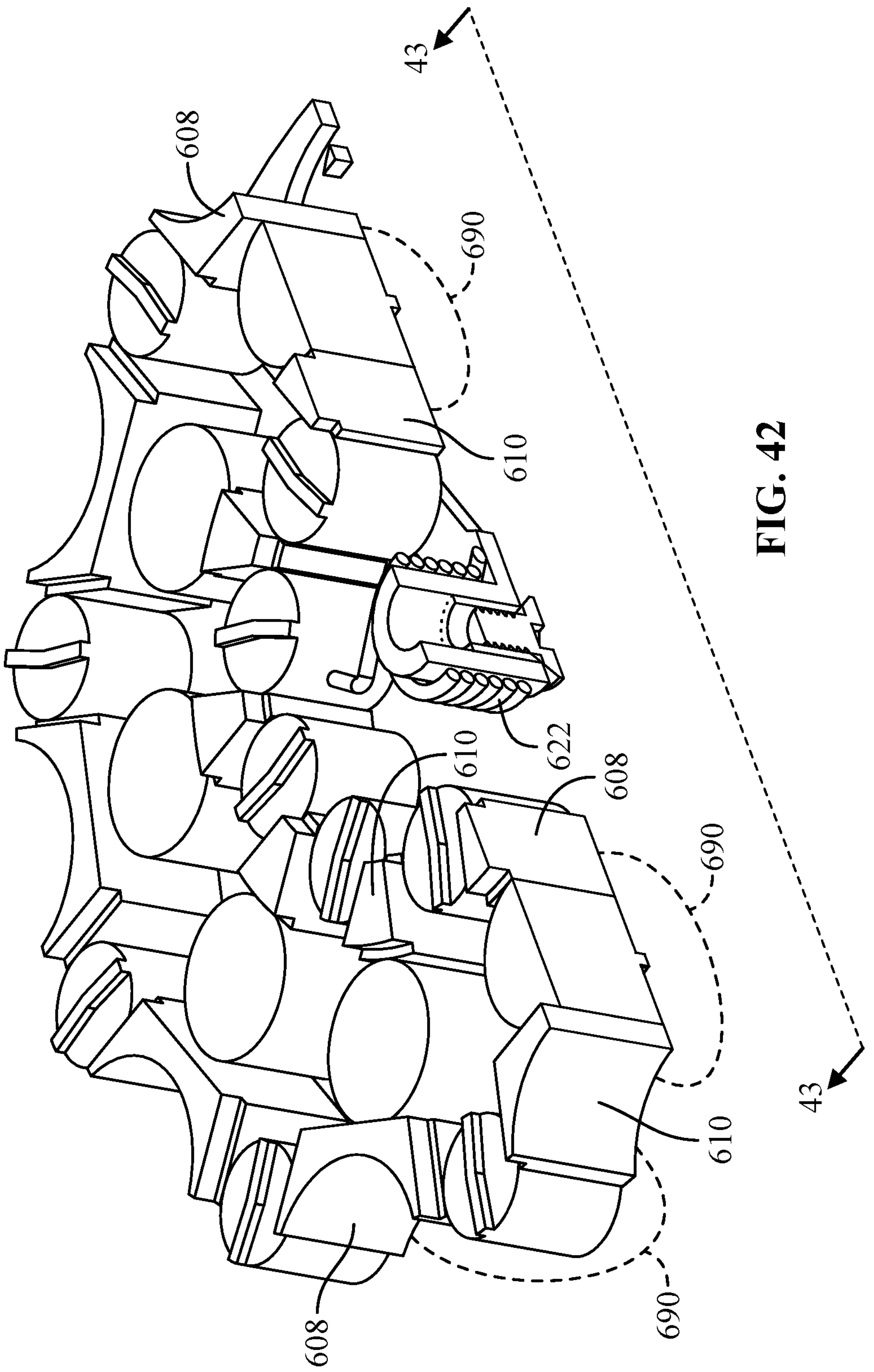
FIG. 42 is a cross sectional view FIG. 41.
Figure 43:
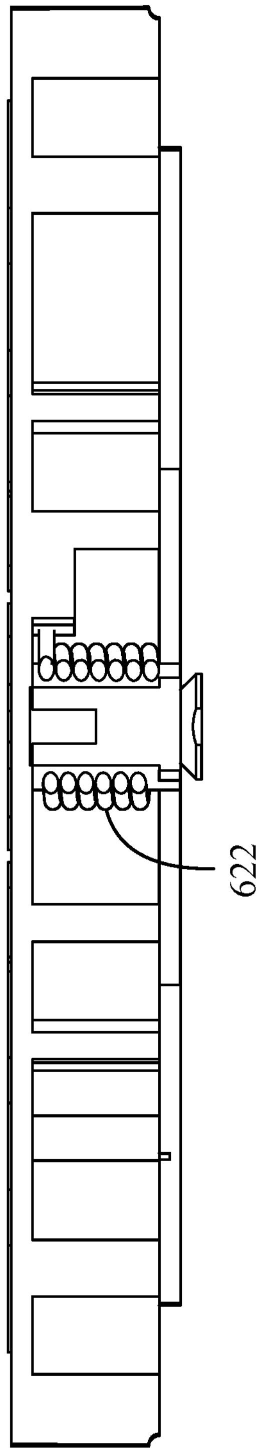
FIG. 43 is a front view of the cross sectional area shown in FIG. 42.
Figure 44:
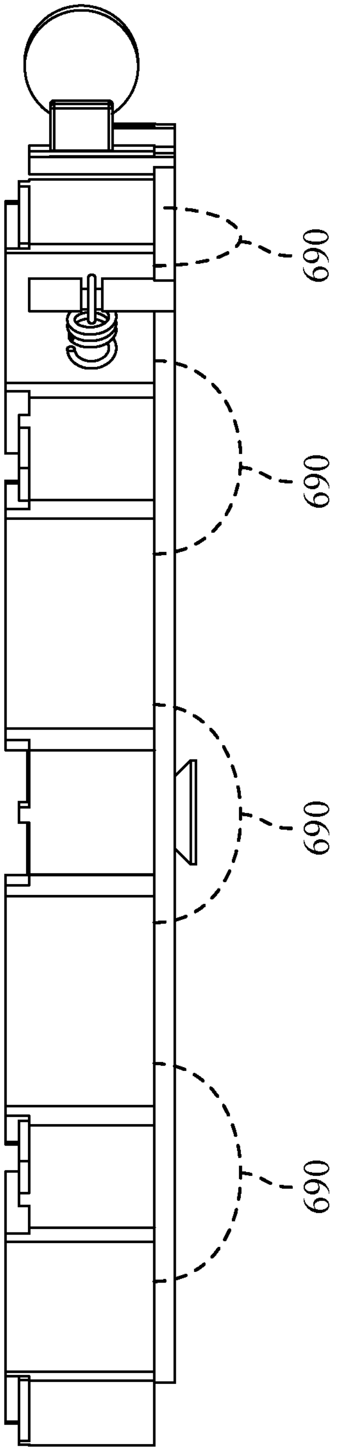
FIG. 44 is a front view of FIG. 41.

Referring now to FIGS. 6-9 for the first embodiment, FIG. 13 for the second embodiment, FIG. 19 for the third embodiment, FIGS. 24 and 25 for the fourth embodiment, FIGS. 31, 32 and 34 for the fifth embodiment and FIG. 42 for the sixth embodiment, a description of the flux jumping out of the first and second ferrous members 108-608, 110-610 will be discussed. When the on position (i.e., configuration) exists, the flux 190-690 from the first poles 112-612, 116-616 of the first and second magnets 104-604, 106-606 is flowed through the first ferrous members 108-608. The first ferrous member 108-608 essentially becomes a first pole 116-616 through which flux from the first poles 116-616 of the first and second magnets 104-604, 106-606 emanates from. Also, the flux from the second poles of the first and second magnets 104, 106 is flowed through the second ferrous members 110. The second ferrous member 110 essentially becomes a second pole through which the flux from the second poles of the first and second magnets 106 emanates from. The flux that flows through the first ferrous member 108-608 jumps out. The flux that flow through the second ferrous member 110-610 jumps out. The flux that jumps out of the first ferrous member 108-608 flows toward, is connected to the flux that jumps out of the second ferrous member 110-610.

The flux from these first and second magnets 104, 106 are not contained within the first and second ferrous members 108, 110. The flux from the first poles 116-616 seeks to match with the surround flux from the second poles 118-618 by jumping out of the ferrous members 108-608, 110-610 to immediately the adjacent opposite poled ferrous member.

The first ferrous members 108 essentially becomes a first pole. The second ferrous members 110 essentially becomes a second pole. The flux from the first poles 112, 116 of the first and second magnets 104, 106 want to flow toward the second pole. In this regard, it jumps over and is attracted to or connects to the flux from the second poles 114, 118 of the first and second magnets 104, 106 that flows through the second ferrous members 110. The flux that jumps out also extends beyond the surface 142 of the housing 102 and is what generates the attractive force.

It is also contemplated that flux shaper or guides (e.g., plastic) may be utilized to direct the flux between the first and second ferrous members 1108-608, 110-610. By way of example and not limitation, the flux guide 592 may be disposed between the first and second ferrous members 508, 510. The flux guide mitigates the flux that emanates from the first and second ferrous members 508, 510 from flowing laterally and not jumping out of the housing. The flux guide 592 may be implemented in the other embodiments discussed herein to facilitate the jumping out of the flux from the housing when the assembly is in the on position.

Figure 47:
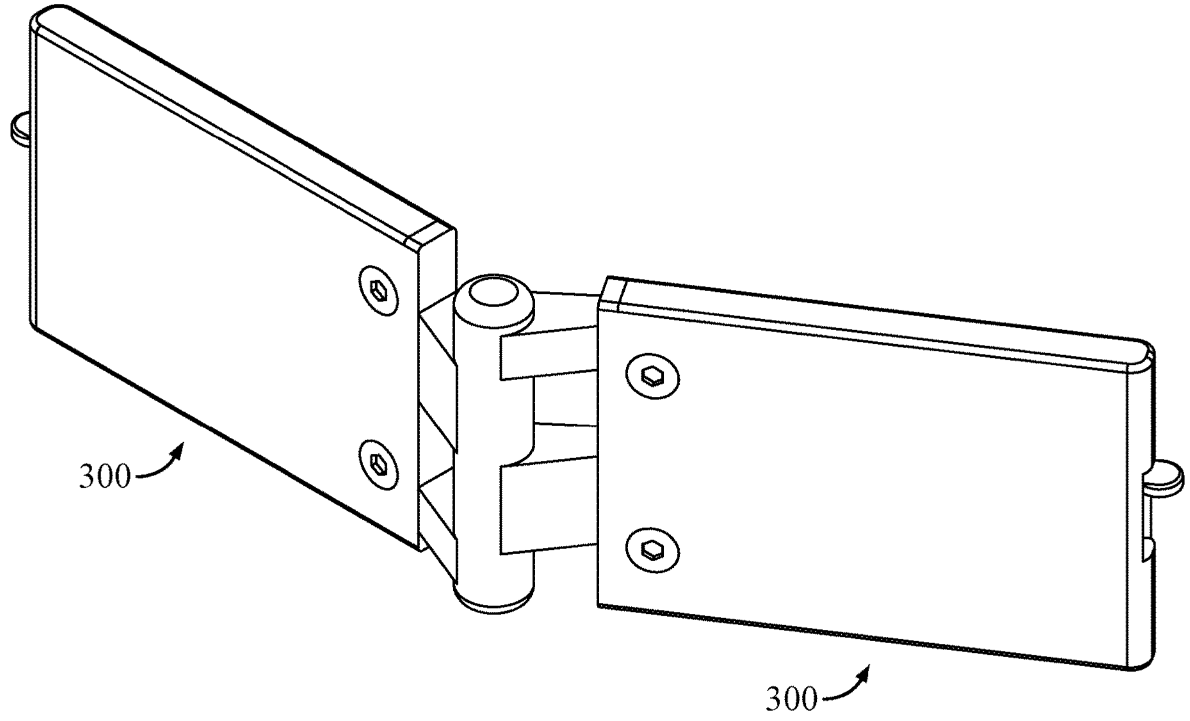
FIG. 47 illustrates an opposed side of the assembly shown in FIG. 46.
Figure 48:
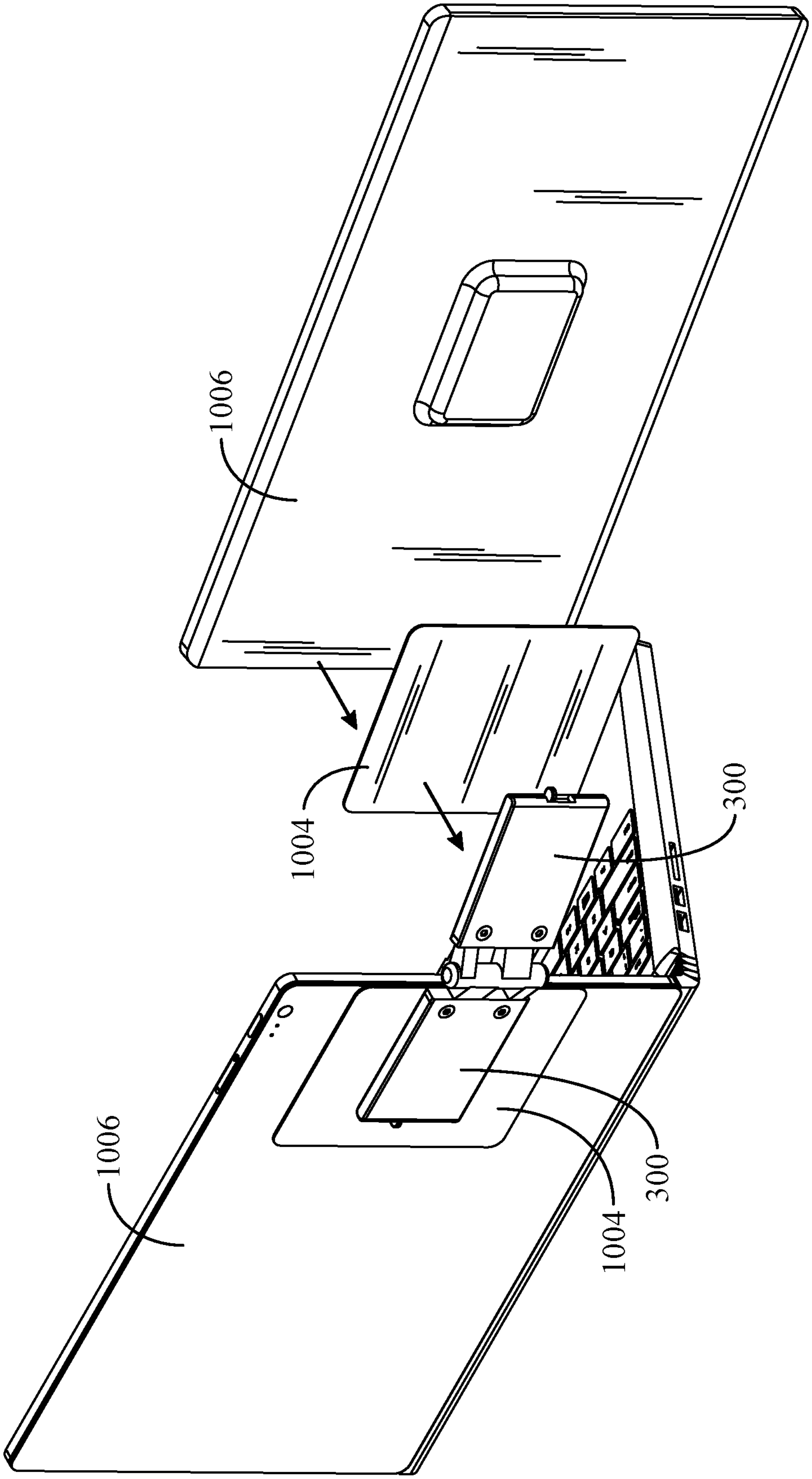
FIG. 48 illustrates the assembly shown in FIGS. 46 and 47 used to hold monitors.
Figure 49:
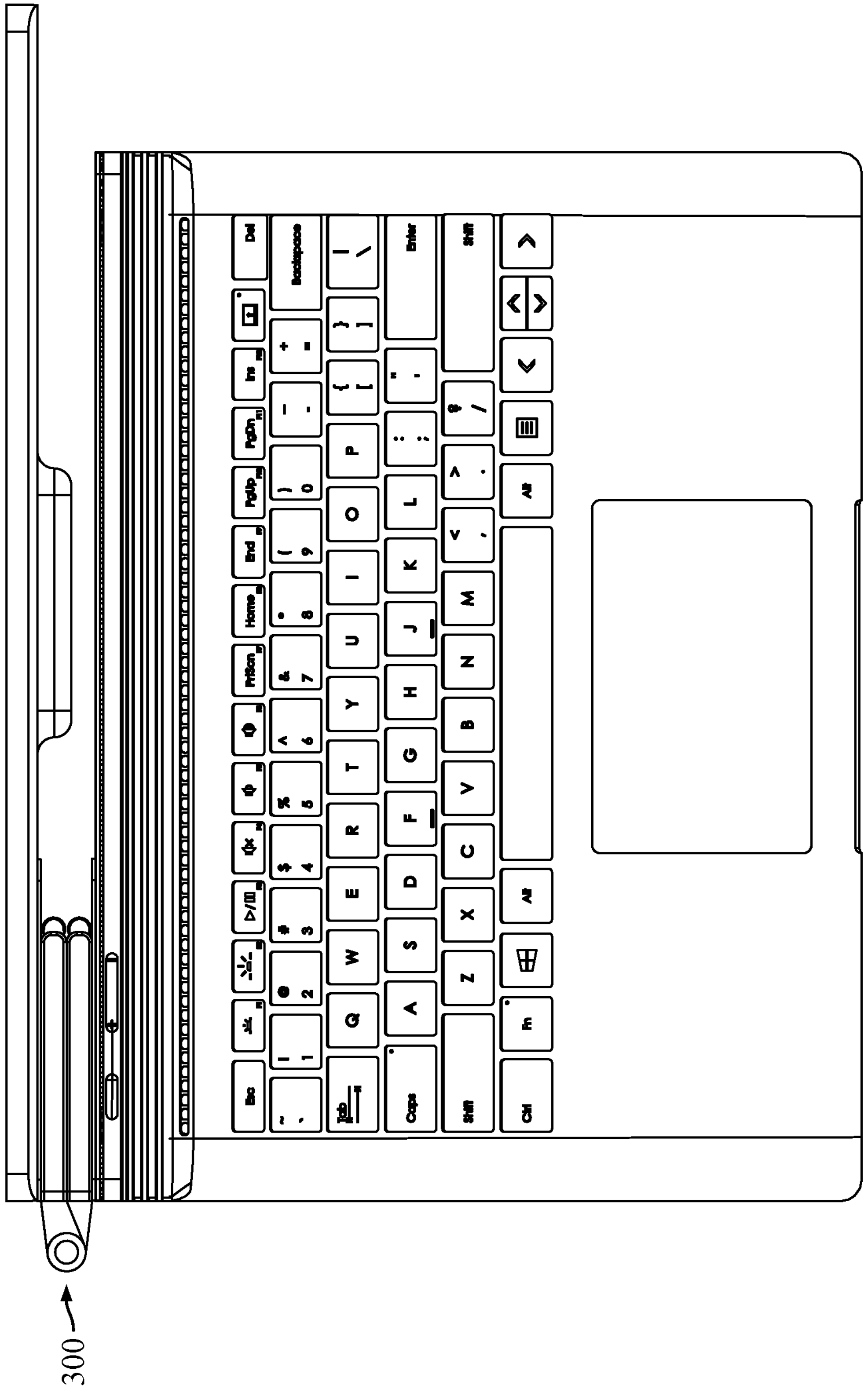
FIG. 49 illustrates the assembly being used to attach a monitor to a laptop computer monitor.
Figure 50:
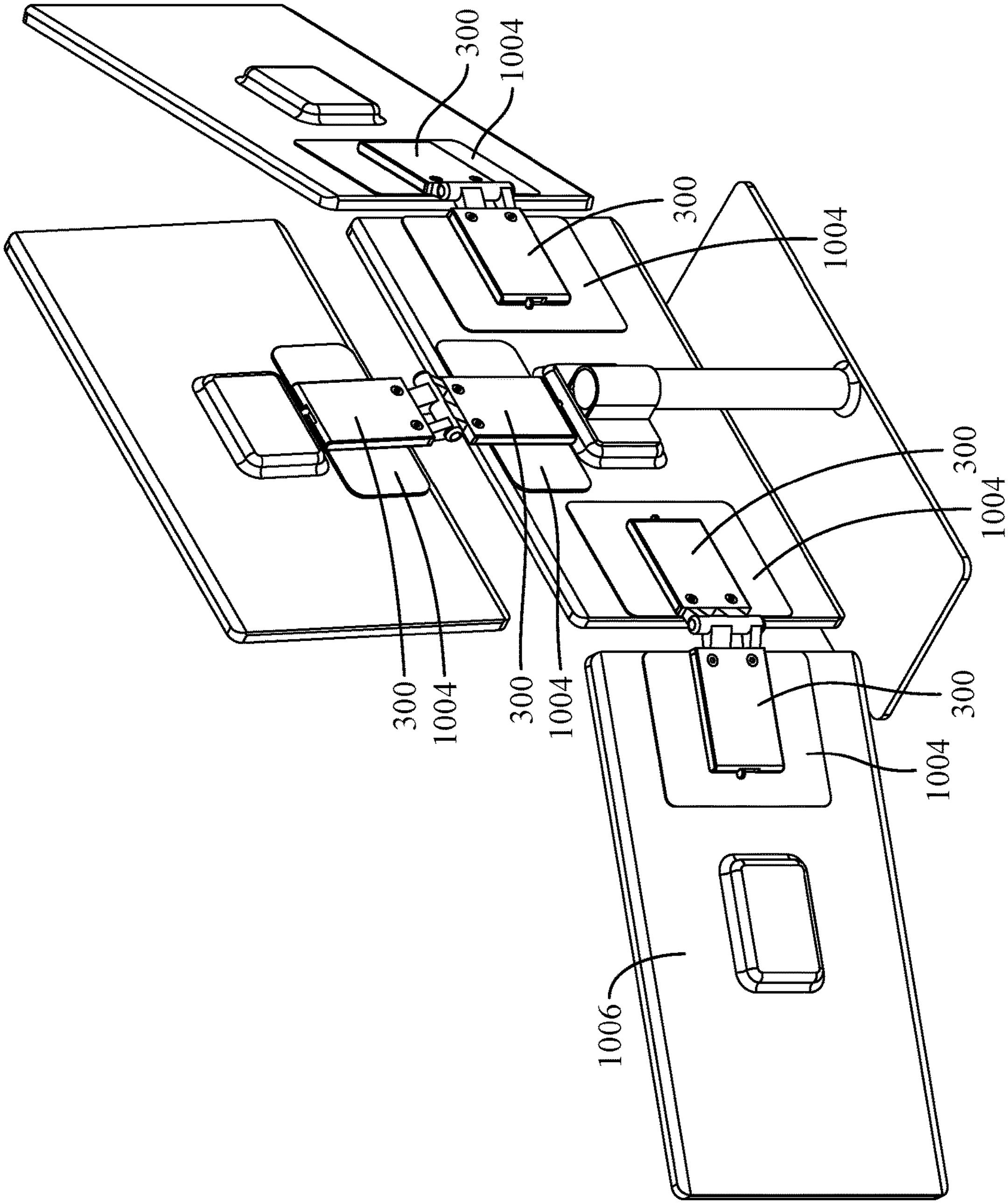
FIG. 50 illustrates the assembly being used to attach multiple monitors to each other.

Referring now to FIGS. 46-50, the assembly 300 may be used to attached two objects to each other. In FIGS. 46-50, the two objects are two computer monitors. However, it is contemplated that the assembly 300 may be utilized to attach any two objects. The assembly 300 may be rotationally attached to another assembly 300 at joint 1002. FIG. 47 illustrates the back side of the joined assemblies 300 shown in FIG. 46. A magnetizable sheet 1004 may be attached to the monitor 1006. The assembly 300 is removably attachable to the magnetizable sheet. To attach the assembly 300 to the sheet 1004, the user may switch the assembly to the off position. Also, the user brings the assembly close to the sheet 1004. When the assembly 300 is in position, the user may actuate the button 366 to traverse the second magnets 306 to the on position. At that time, the flux from the magnets 304, 306 jumps out and is attracted to the sheet 1004. As shown in FIG. 49, the user can rotate one of the monitors 1006 behind the other monitor by rotating the monitor via the joint 1002. Additional monitors may be attached to each other as shown in the configuration shown in FIG. 50. To remove the monitors 1006, the user actuates the button 366 to traverse the second magnets to the off position.

Although the assembly 300 was illustrated in FIGS. 46-50, the other assemblies 100, 200, 400, 500, 600 may be used to attach two objects. By way of example and not limitation, the housings 102, 602 of assemblies 100, 600 may be attached (e.g., permanently attached, adhered to, etc.) to a first object. The second object may be a magnetizable material and attached to the surface 142, 642 (see FIGS. 1 and 35) of the assemblies 100, 600 when the assemblies 100, 600 are traversed to the on position. To remove the second object, the assembly 100, 600 is traversed to the off position.

The assembly 200 may be used in the same manner discussed in relation to the third embodiment and FIGS. 46-50.

The assembly 400 may be attached to the first object via a bolt 1008. The assembly 500 may be bolted onto the first object via the bolt pattern 1010.

Referring now to FIGS. 2, 11, 16, 23, and 39 the locking mechanism 120, 220, 320, 420, 520 may be biased toward the off-position. When the locking mechanism 120, 220, 320, 420, 520 is biased toward the off position, the biasing member 122, 222 (see FIG. 13), 322, 422 (see FIGS. 23 and 26), 622 (see FIG. 42) retracts the rack 162, rack 262, rack 362, rack 462 (see FIG. 27) and subframe 682 (see FIG. 37). The locking mechanism 120, 220, 320, 420, 620 has a button 166, 266, 366, 466, 666 to traverse the locking mechanism to the on position. The user can depress the button 166, 266, 366, 466, 666 to traverse the rack 162, rack 262, rack 362, rack 462 (see FIGS. 23 and 27) and subframe 682 (see FIG. 37) in the direction of arrow 168 (see FIG. 5), 268, 368, 468, 668 so that the locking mechanism 120, 220, 320, 420, 620 is locked and the assembly is in the on position via lock 170, 270, 370, 470, 670. When the locking mechanism 120, 220, 320, 420, 620 is in the locked position, the assembly 100, 200, 300, 400, 600 may be in the on position. It is also contemplated that the locking mechanism may be configured in the opposite configuration so that the locking mechanism biases the second magnets in the on position and only when the button 166, 266, 366, 466, 666 is depressed does the second magnets move or rotate so that the assembly 100, 200, 300, 400, 600 is now in the off position and the lock of the locking mechanism 120, 220, 320, 420, 620 is then engaged to maintain the assembly in the off-position.

In relation to the fifth embodiment, referring to FIG. 29, an allen wrench may be used to turn the nut so as to move or rotate the pinion 548, and thus the gears 591 and the second magnets 506 to turn the assembly 500 on and off.

Figure 52:
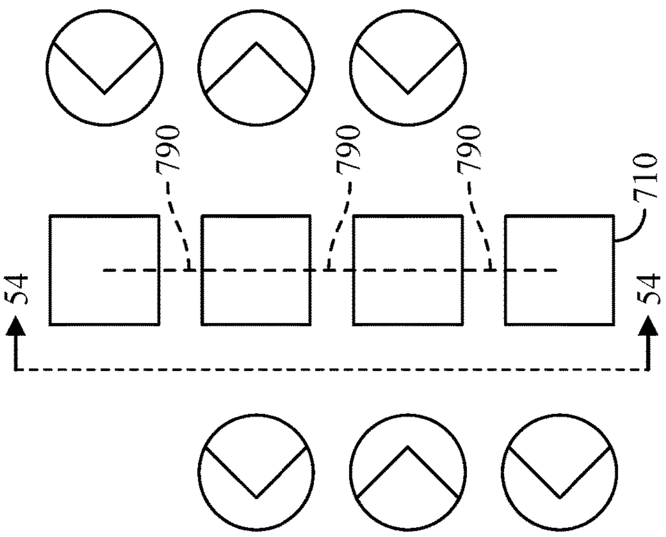
FIG. 52 illustrates the embodiment shown in FIG. 51 in an on position.
Figure 54:
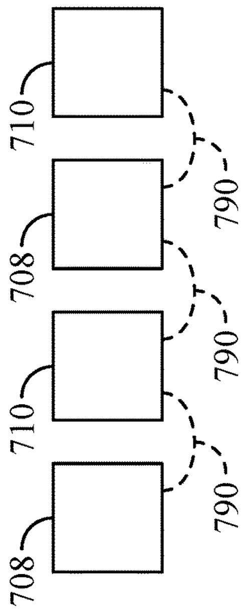
FIG. 54 illustrates a view of the embodiment shown in FIG. 52.
Figure 51:
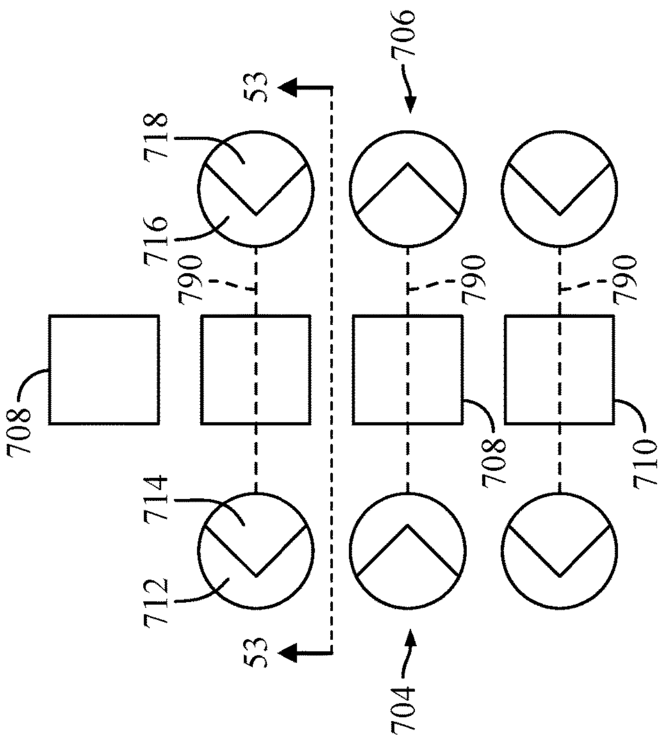
FIG. 51 illustrates another embodiment in an off position.
Figure 53:
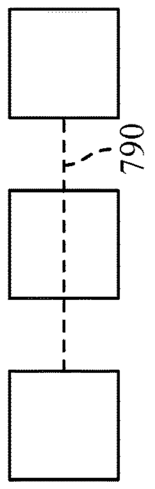
FIG. 53 illustrates a view of the embodiment shown in FIG. 51.

Referring now to FIGS. 51-54, the second magnets 706 are shown as being traversed or moved in a linear direction. The second magnets 706 can be moved in a linear path by attaching the second magnets 706 to a linear track. It is also contemplated that the track may be curvilinear so that the second magnets are traversed on a curvilinear path. As shown in FIGS. 51 and 53, in the off position, the flux from the first poles 712 of the first magnets 704 and the flux from the second poles 718 are matched to each other and predominately stay within the first ferrous member 708. Also, the flux from the second poles 714 of the first magnets 704 and the flux from the first poles 716 of the second magnets 708 are matched to each other and predominately stay within the second ferrous member 710. As shown in FIGS. 52 and 54, the flux from the first poles 712 of the first magnets 704 and the flux from the first poles 716 flow through the first ferrous member 708. Also, the flux from the second poles 714 of the first magnets 704 and the flux from the second poles 718 of the second magnets are flowed through the second ferrous member 710. The flux that flows through the first and second ferrous members 708, 710 jump and are connect to the flux of opposite poles that flow through an adjacent ferrous member 708, 710 so that an assembly of the magnet arrangement shown in FIGS. 51-54 can be magnetically attached to a magnetizable surface.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An on-off switchable magnet assembly, the assembly comprising:

a housing;

a plurality of first magnets mounted to the housing, each of the first magnets defining first and second opposite poles;

a plurality of second magnets mounted to the housing, each of the second magnets defining first and second opposite poles;

a plurality of first ferrous members mounted to the housing;

a plurality of second ferrous members mounted to the housing; and wherein in an off position, each of the first poles of the first magnets is closest to the first ferrous members, each of the second poles of the first magnets is closest to the second ferrous members, each of the first poles of the second magnets is closest to the second ferrous member and each of the second poles of the second magnets is closest to the first ferrous member;

wherein in an on position, each of the first poles of the first magnets is closest to the first ferrous members, each of the second poles of the first magnets is closest to the second ferrous members, each of the first poles of the second magnets is closest to the first ferrous member and each of the second poles of the second magnets is closest to the second ferrous member.

2. The assembly of claim 1 wherein the first and second magnets are in a linear array.

3. The assembly of claim 1 wherein the first and second magnets are in a radial array.

4. The assembly of claim 1 wherein the first magnets are stationary, and the second magnets are traversable in a straight direction to traverse the first poles of the second magnets from being closest to the second ferrous member to the first ferrous member and the second poles of the second magnets from being closest to the first ferrous member to the second ferrous member.

5. The assembly of claim 4 wherein the second magnets are held together with a sub housing for traversing the second magnets in the straight direction simultaneously.

6. The assembly of claim 1 wherein the first magnets are stationary, and the second magnets are traversable in a curved direction to traverse the first poles of the second magnets from being closest to the second ferrous member to the first ferrous member and the second poles of the second magnets from being closest to the first ferrous member to the second ferrous member.

7. The assembly of claim 6 wherein the second magnets are held together with a sub housing for traversing the second magnets in the curved direction simultaneously.

8. The assembly of claim 1 wherein the second magnets are rotatable about a rotational axis to traverse the first poles of the second magnets from being closest to the second ferrous member to the first ferrous member and the second poles of the second magnets from being closest to the first ferrous member to the second ferrous member.

9. The assembly of claim 1 wherein the housing is fabricated from a non ferrous material.

10. The assembly of claim 1 wherein the first ferrous members do not directly contact each other and do not directly contact any of the second ferrous members, and the second ferrous members do not directly contact each other and do not directly contact any of the first ferrous members.

11. A method of switching an on-off switchable magnet assembly, the method comprising the steps of:

providing the on-off switchable magnet assembly, the assembly comprising:

a housing;

a plurality of first magnets mounted to the housing, each of the first magnets defining first and second opposite poles;

a plurality of second magnets mounted to the housing, each of the second magnets defining first and second opposite poles;

a plurality of first ferrous members mounted to the housing;

a plurality of second ferrous members mounted to the housing;

wherein the first poles of the first magnets are closest to the first ferrous members and the second poles of the first magnets are closest to the second ferrous members;

switching the on-off switchable magnet assembly from an off position to an on position;

traversing the first poles of the second magnets from being closest to the second ferrous members to being closest to the first ferrous members and the second poles of the second magnets from being closest to the first ferrous members to being closest to the second ferrous members;

switching the on-off switchable magnet assembly from the on position to the off position;

traversing the first poles of the second magnets from being closest to the first ferrous members to being closest to the second ferrous members and the second poles of the second magnets from being closest to the second ferrous members to the first ferrous members.

12. The method of claim 11 wherein the step of traversing the first poles of the second magnets from being closest to the first ferrous members to being closest to the second ferrous members and the second poles of the second magnets from being closest to the second ferrous members to the first ferrous members comprises a step of:

traversing the second magnets in a straight direction.

13. The method of claim 11 wherein the step of traversing the first poles of the second magnets from being closest to the first ferrous members to being closest to the second ferrous members and the second poles of the second magnets from being closest to the second ferrous members to the first ferrous members comprises a step of:

traversing the second magnets in a curved direction.

14. The method of claim 11 wherein the step of traversing the first poles of the second magnets from being closest to the first ferrous members to being closest to the second ferrous members and the second poles of the second magnets from being closest to the second ferrous members to the first ferrous members comprises a step of:

rotating the second magnets about a rotational axis.

* * * * *